US008261484B2

(12) United States Patent
Bono

(10) Patent No.: US 8,261,484 B2
(45) Date of Patent: Sep. 11, 2012

(54) DETACHABLE SINKER WITH WATER SOLUBLE ATTACHMENT

(76) Inventor: Robert Paul Bono, Dana Point, CA (US)

(*) Notice: Subject to any disclaimer, the term of this patent is extended or adjusted under 35 U.S.C. 154(b) by 653 days.

(21) Appl. No.: 12/269,641

(22) Filed: Nov. 12, 2008

(65) Prior Publication Data
US 2009/0133315 A1 May 28, 2009

Related U.S. Application Data

(60) Provisional application No. 60/990,860, filed on Nov. 28, 2007.

(51) Int. Cl.
*A01K 95/00* (2006.01)
(52) U.S. Cl. ....... 43/43.12; 43/43.1; 43/44.87; 43/44.92
(58) Field of Classification Search .............. 43/43.1, 43/43.12, 44.87, 44.9, 44.91, 44.92, 44.93, 43/44.95, 44.97
See application file for complete search history.

(56) References Cited

U.S. PATENT DOCUMENTS

| 327,100 | A | * | 9/1885 | Palm | 43/44.91 |
|---|---|---|---|---|---|
| 676,724 | A | * | 6/1901 | McCargar et al. | 43/44.95 |
| 2,308,238 | A | * | 1/1943 | Baker | 43/43.12 |
| 2,395,892 | A | * | 3/1946 | Lontz | 43/44.91 |
| 2,406,252 | A | * | 8/1946 | Potter | 43/44.9 |
| 2,655,758 | A | * | 10/1953 | Warren | 43/44.9 |
| 2,687,592 | A | * | 8/1954 | Purcell | 43/43.12 |
| 2,741,067 | A | * | 4/1956 | Cox | 43/44.9 |
| 2,754,614 | A | * | 7/1956 | Yakel | 43/43.12 |
| 2,814,902 | A | * | 12/1957 | Matteson | 43/43.12 |
| 2,841,911 | A | * | 7/1958 | Dahlgren | 43/43.12 |
| 3,029,544 | A | * | 4/1962 | Dimatteo | 43/43.12 |
| 3,030,726 | A | * | 4/1962 | Knapton | 43/44.93 |
| 3,081,574 | A | * | 3/1963 | Wise | 43/43.12 |
| 3,180,051 | A | * | 4/1965 | Freeman | 43/43.12 |

(Continued)

FOREIGN PATENT DOCUMENTS
DE 102009008709 A1 * 8/2010
(Continued)

OTHER PUBLICATIONS

David Fisher, "How to Make Fizzy Bath Bombs", About.com, http://candleandsoap.about.com/od/bathbody/ss/bathbombs.htm, copyright 2008.

*Primary Examiner* — Darren W Ark
(74) *Attorney, Agent, or Firm* — Sean D. Burdick

(57) ABSTRACT

A detachable sinker automatically detaches from fishing line after immersion in water. The sinker includes weight attachable to the line by means of a rapidly disintegrating water soluble material. The disintegrating material may comprise a product that when dry withstands a casting load and when wet rapidly dissolves. The weight may be biodegradable or dissolvable. The sinker may include a wildlife attractant released by the disintegrating material or by the dissolvable weight, may be rated according to an approximate time or depth at which the weight or attractant will release from the line, may display readable indicia corresponding to a weight value, a release time, or a depth, and may include an attachment means coupling the disintegrating material to the line, such as an elongated clamp for compressing the fishing line and the disintegrating material, a mass of moldable adhesive, or a perforated attachment for threading the disintegrating material therethrough. The sinker may be an assembly including the detachable sinker and a fixed sinker.

6 Claims, 12 Drawing Sheets

U.S. PATENT DOCUMENTS

| | | | | |
|---|---|---|---|---|
| 3,393,467 A | * | 7/1968 | Potter et al. | 43/43.12 |
| 3,405,476 A | * | 10/1968 | Pumilio | 43/43.12 |
| 3,415,005 A | * | 12/1968 | Gilham | 43/43.12 |
| 3,426,469 A | * | 2/1969 | Lee et al. | 43/43.12 |
| 3,513,583 A | * | 5/1970 | Leash et al. | 43/43.12 |
| 3,648,398 A | * | 3/1972 | Newell | 43/43.12 |
| 3,670,447 A | * | 6/1972 | Wohead | 43/44.97 |
| 3,680,250 A | * | 8/1972 | Hetrick | 43/41.2 |
| 3,685,196 A | * | 8/1972 | Scott | 43/43.12 |
| 3,744,177 A | * | 7/1973 | Cron, Jr. | 43/43.12 |
| 3,834,059 A | * | 9/1974 | Overstreet | 43/43.12 |
| 3,854,235 A | * | 12/1974 | Thompson | 43/43.12 |
| 3,925,921 A | * | 12/1975 | Tucker et al. | 43/43.12 |
| 3,967,407 A | * | 7/1976 | Halbasch | 43/44.9 |
| 3,991,505 A | * | 11/1976 | Simeti | 43/43.12 |
| 4,058,926 A | * | 11/1977 | Harrigan | 43/43.12 |
| 4,186,907 A | * | 2/1980 | Snodgrass | 43/43.12 |
| 4,286,403 A | * | 9/1981 | Rogers | 43/43.12 |
| 4,301,610 A | * | 11/1981 | Brown | 43/44.97 |
| 4,501,083 A | * | 2/1985 | Ong | 43/42 |
| 4,616,441 A | * | 10/1986 | Dmytriw | 43/44.91 |
| 4,663,881 A | * | 5/1987 | Follett | 43/43.12 |
| 4,679,349 A | * | 7/1987 | Birchfield | 43/44.97 |
| 4,753,030 A | * | 6/1988 | Ziglinski | 43/43.12 |
| 4,837,968 A | * | 6/1989 | Lin | 43/43.12 |
| 4,910,908 A | * | 3/1990 | Rosenburg | 43/44.97 |
| 4,926,580 A | * | 5/1990 | Lin | 43/43.12 |
| 5,031,351 A | * | 7/1991 | Rogel | 43/43.12 |
| 5,054,227 A | * | 10/1991 | Lin | 43/43.12 |
| 5,157,860 A | * | 10/1992 | Clark | 43/43.12 |
| 5,243,779 A | * | 9/1993 | Reed | 43/43.12 |
| 5,375,365 A | * | 12/1994 | Bronder | 43/43.12 |
| 5,461,821 A | * | 10/1995 | Carter, Jr. | 43/43.12 |
| 5,511,338 A | * | 4/1996 | Costanzo | 43/42.28 |
| 5,570,536 A | * | 11/1996 | Panovic | 43/44.92 |
| 5,784,825 A | * | 7/1998 | Ross | 43/43.12 |
| 5,890,316 A | * | 4/1999 | Rodgers et al. | 43/43.16 |
| 6,836,997 B2 | * | 1/2005 | Cramsey | 43/44.91 |
| 6,851,217 B1 | * | 2/2005 | Rayner | 43/43.12 |
| 2004/0000385 A1 | * | 1/2004 | Ratte | 43/43.1 |
| 2005/0055868 A1 | * | 3/2005 | Ratte | 43/44.87 |
| 2005/0076558 A1 | * | 4/2005 | Jeffers | 43/44.87 |
| 2009/0094880 A1 | * | 4/2009 | Gifford et al. | 43/43.1 |
| 2011/0203156 A1 | * | 8/2011 | Christiansen | 43/43.1 |

FOREIGN PATENT DOCUMENTS

| | | | |
|---|---|---|---|
| EP | 951827 A1 | * | 10/1999 |
| GB | 2246275 A | * | 1/1992 |
| GB | 2284334 A | * | 6/1995 |
| JP | 2000083542 A | * | 3/2000 |
| JP | 2000166448 A | * | 6/2000 |
| JP | 2000253788 A | * | 9/2000 |
| JP | 2001204332 A | * | 7/2001 |
| JP | 2003180213 A | * | 7/2003 |
| JP | 2003299428 A | * | 10/2003 |
| JP | 2005328701 A | * | 12/2005 |
| JP | 2009247347 A | * | 10/2009 |
| WO | WO 9620591 A1 | * | 7/1996 |
| WO | WO 2005060742 A1 | * | 7/2005 |

* cited by examiner

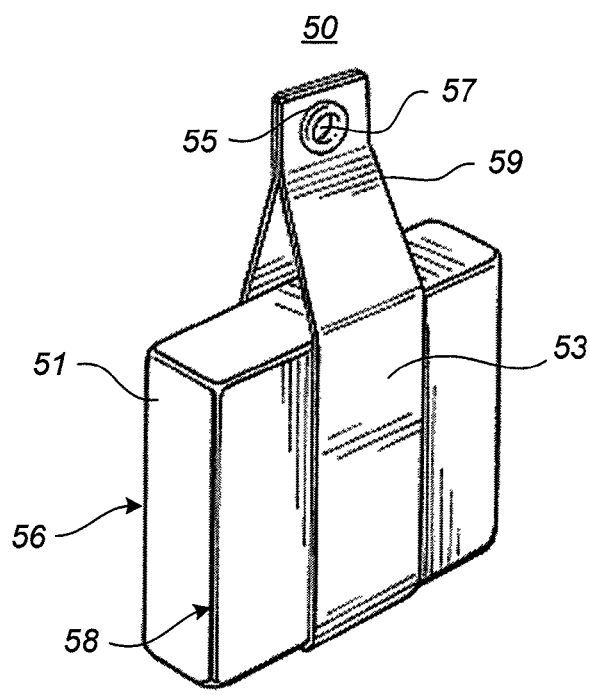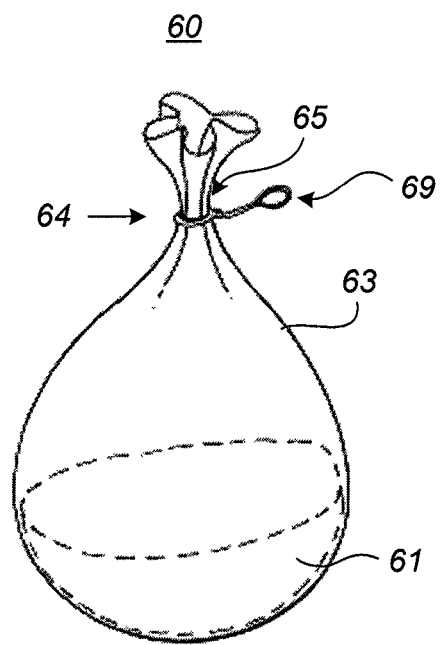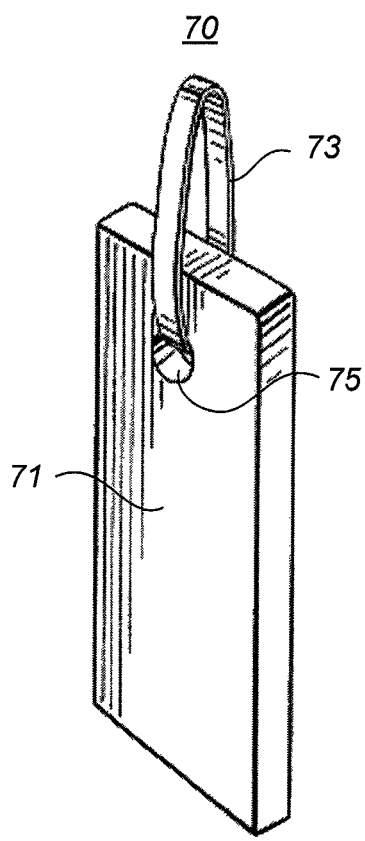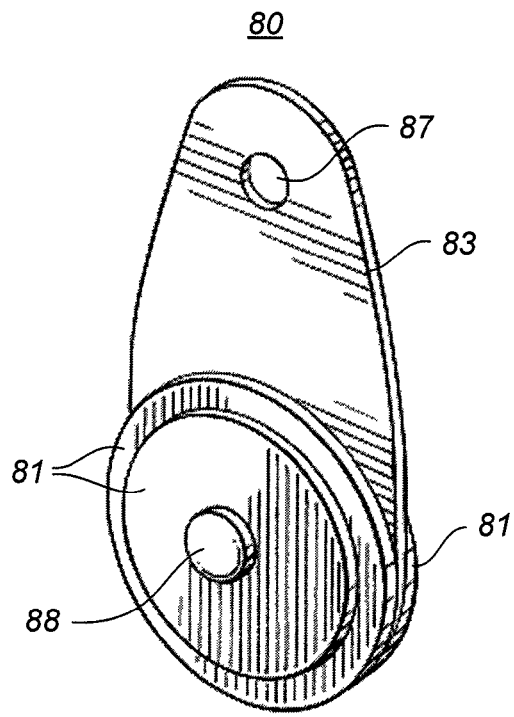
FIG. 5
FIG. 6
FIG. 7
FIG. 8

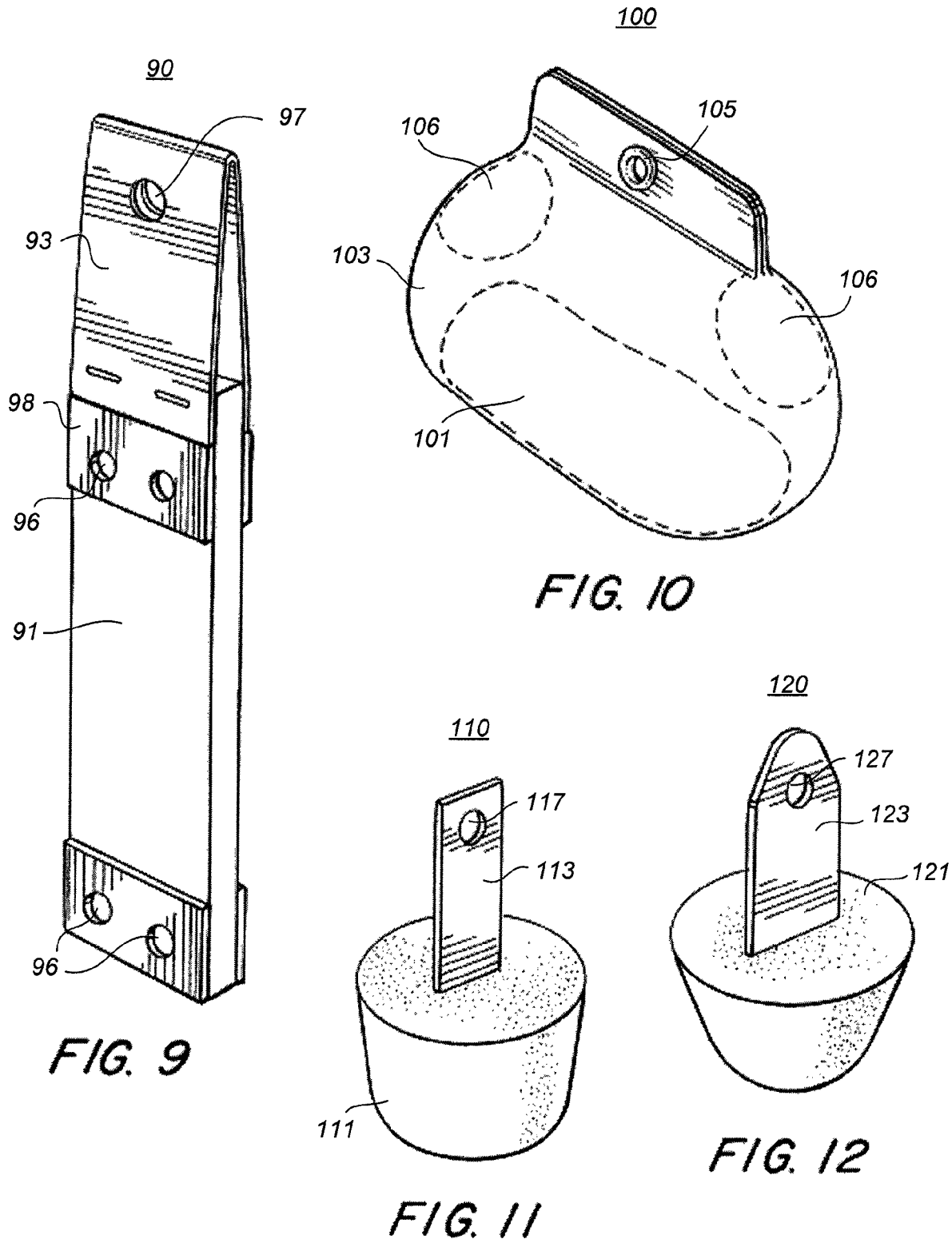

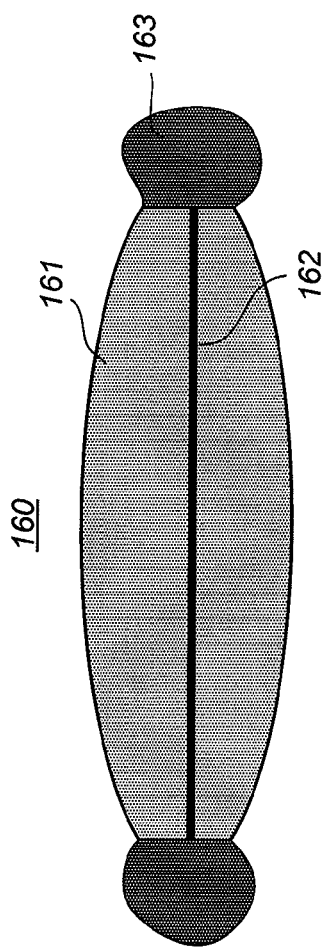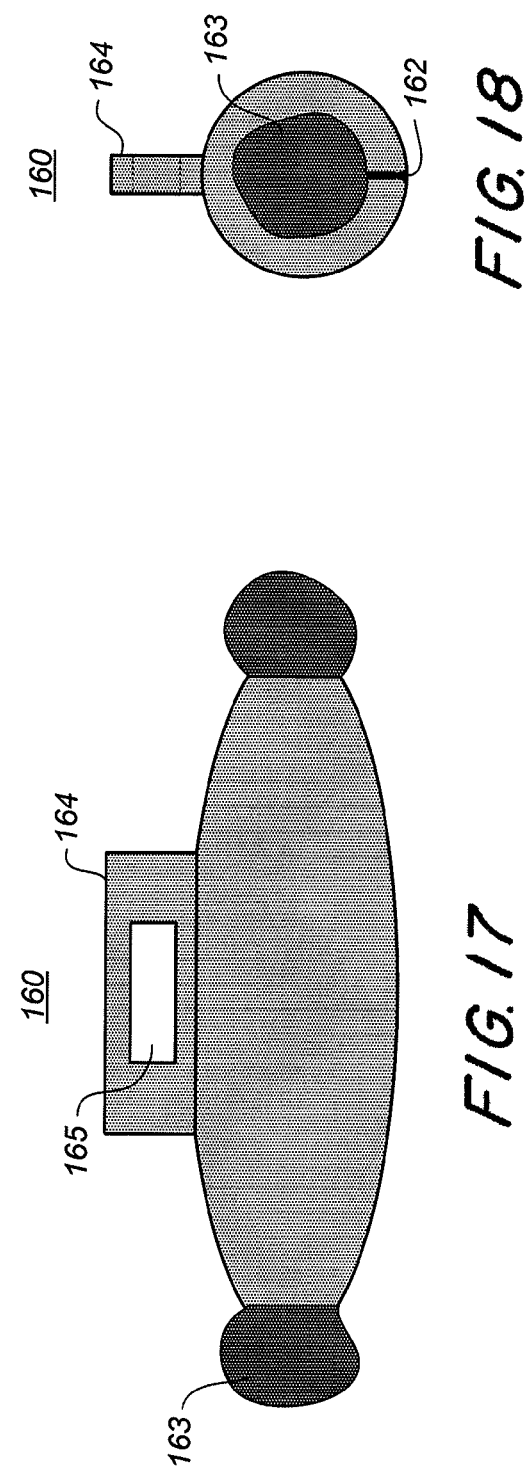

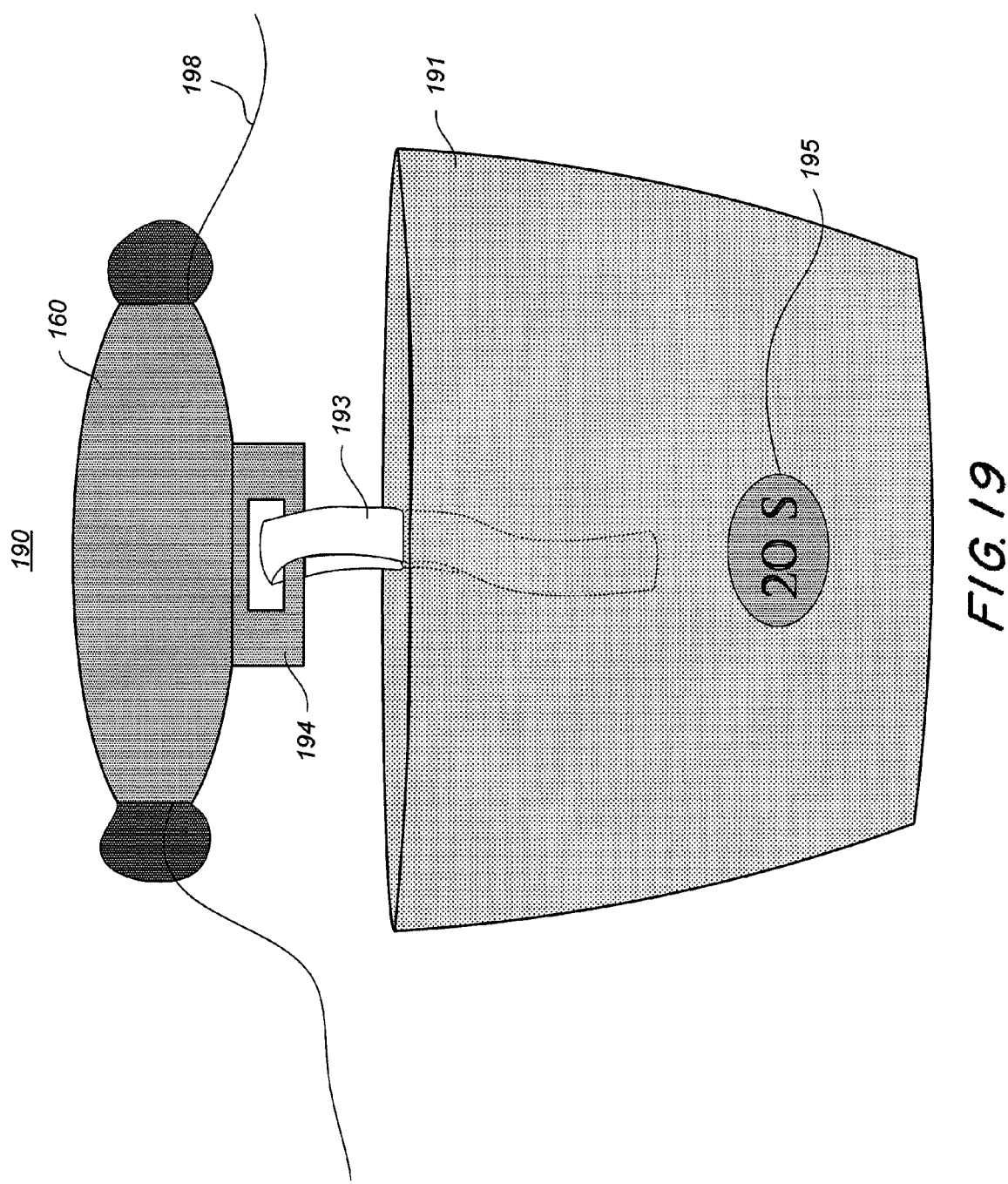

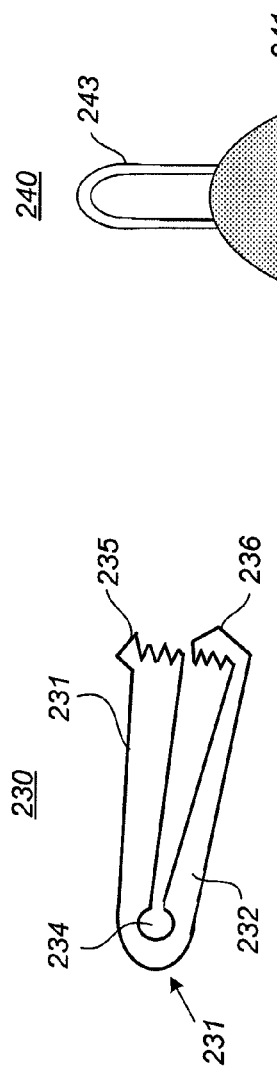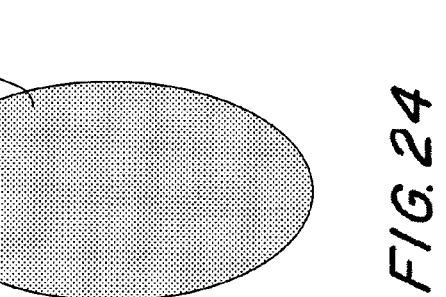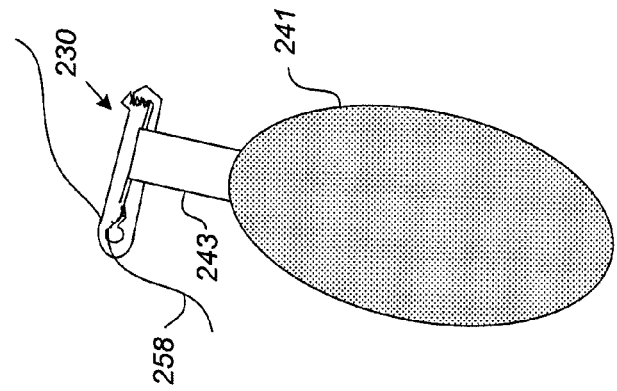

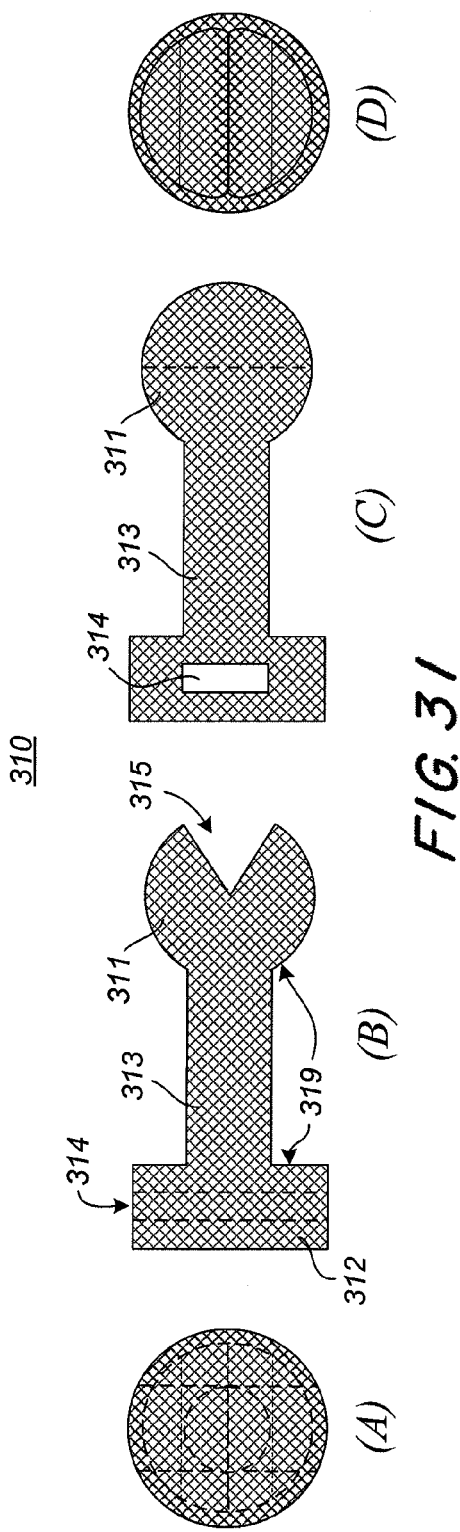
FIG. 31
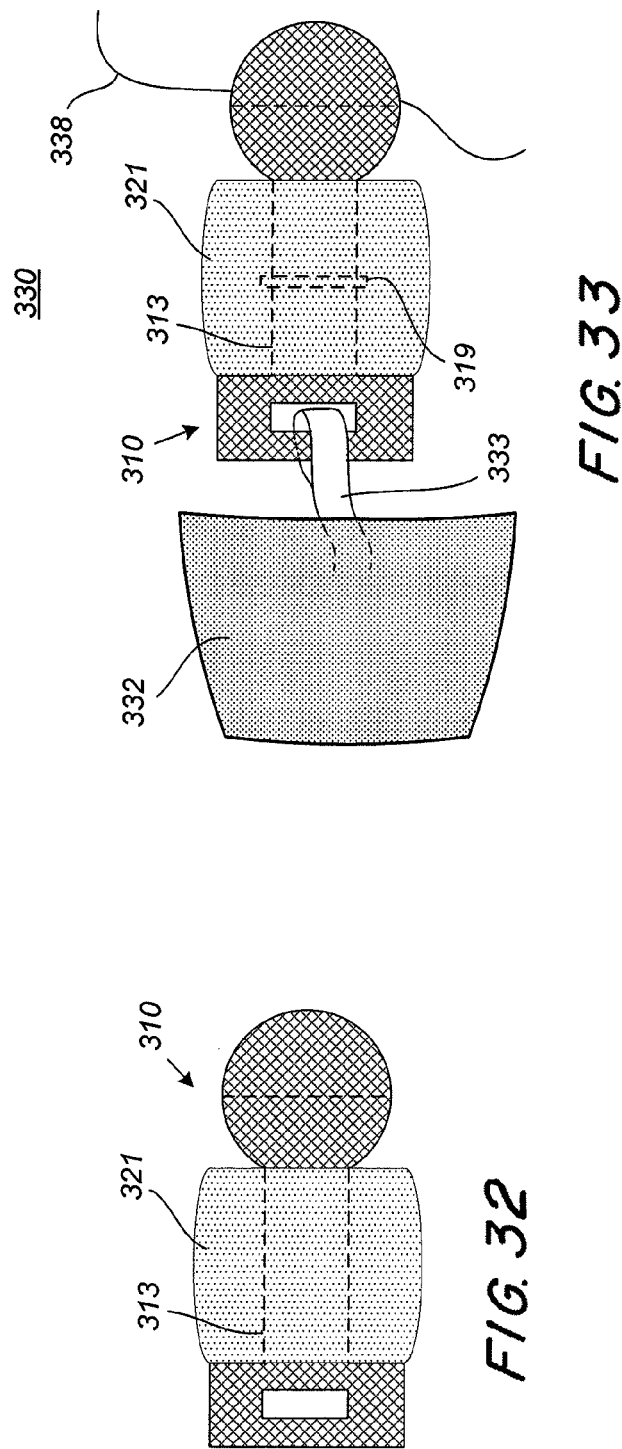
FIG. 32
FIG. 33

DETACHABLE SINKER WITH WATER SOLUBLE ATTACHMENT

This application claims priority to U.S. Provisional Application No. 60/990,860 filed Nov. 28, 2007, which is fully incorporated herein by reference.

BACKGROUND OF THE INVENTION

1. Field of the Invention

The present invention relates generally to detachable sinkers for use with fishing line. More specifically, the invention relates to a disposable sinker having a rapidly disintegrating water soluble material attachable to fishing line.

2. Description of Related Art

The distance that a fisherman can achieve when casting line is conventionally increased by adding weight to the baited end of the line. This weight, commonly called a sinker, may be composed of any dense material, such as lead, and may be attached to the line in any of various ways. One way is by tying the sinker to the baited end using a separate leader. Another way is by attaching the sinker directly to the main line some distance behind the bait, for example, by threading the main line through a loop in the sinker and tying it off, or by compressing a specially formed sinker (known as split shot) directly onto the line. Another way to add weight to the baited end is by forming a fishing lure with integral weight, as is commonly done for spoons, spinners, and other fishing devices designed for deep water or bottom fishing.

While the added weight may improve casting distance, problems may arise after the bait hits the water. One problem is that the weight drags the bait to the bottom. This may not be desirable for certain techniques such as fly fishing, which are used to catch fish that feed near the surface. Another problem is that the weight can interfere with the action of a lure, or cause the line to become tangled during retrieval. Another problem is that dragging too much weight through the water can frighten the fish or otherwise discourage them from biting. But perhaps the biggest problem with loading up on weight is that it greatly increases the chance of snagging the line on the bottom during retrieval. This leaves the fisherman with the frustrating chore of having to cut the line and rig up a new baiting system, not to mention the loss of another hook, line, and sinker.

Fishing and the capture of fish and other water dwelling wildlife would be greatly improved by a sinker that can be added to the baited end of a fishing line and jettisoned after casting.

SUMMARY OF THE INVENTION

The present invention provides a detachable sinker that automatically detaches from fishing line after immersion in water. A detachable sinker according to the invention includes a weight attachable to a fishing line, and a rapidly disintegrating water soluble material connected to the weight for attaching the weight to the fishing line. In one embodiment, the rapidly disintegrating water soluble material comprises a dissolvable product that when dry, possesses sufficient tensile strength to withstand the load of the weight during casting, and when wet, rapidly dissolves to release the weight from the fishing line. The detachable sinker may include a fastening component acting as a strengthening interface between the rapidly disintegrating water soluble material and the fishing line, and may further include a wildlife attractant that is suspended by, held by or held within the rapidly disintegrating water soluble material or a non-disintegrating material. The wildlife attractant may dissolve after immersion and after being rapidly released from the fishing line by the disintegrating material and thus diffuse throughout the water to attract fish to the casting site. In another embodiment, some or all of the wildlife attractant may be left affixed to the line by the non-disintegrating material.

Many embodiments of the invention are presented. The rapidly disintegrating water soluble material may form a loop for attaching the weight to the fishing line. The loop may pass through a hole formed in the weight, or it may wrap one or more times around the weight. The fastening component may join ends of the rapidly disintegrating water soluble material into the loop. The detachable sinker may further include an attachment means for coupling the rapidly disintegrating water soluble material to the fishing line. The attachment means may further include an elongated clamp of compressible material, where the clamp has sufficient length to compress both the fishing line and a length of the rapidly disintegrating water soluble material. Alternatively, the attachment means may include a portion of the rapidly disintegrating water soluble material combined with a mass of moldable adhesive, or the attachment means may include a perforated sinker attachment for threading the rapidly disintegrating water soluble material therethrough.

In another embodiment, the weight of the sinker may be a dissolvable weight. The dissolvable weight may be formed or molded from a melange of wet and dry ingredients, and the rapidly disintegrating water soluble material may be connected to the weight by partially sinking it into the melange prior to curing the weight. The dissolvable weight may include a wildlife attractant as an ingredient.

In another embodiment, a detachable sinker according to the invention may include indicia indicating a weight value, a release time, or a depth rating for the rapidly disintegrating water soluble material. The release time or depth rating may indicate the approximate time or depth at which the rapidly disintegrating water soluble material releases the weight from the fishing line, and if so equipped, releases the wildlife attractant into the water.

In another embodiment, a detachable sinker according to the invention includes a plurality of circular weights concentrically arranged, each weight having a center hole, a clamping means disposed through the center holes, and a rapidly disintegrating water soluble tab clamped between the circular weights by the clamping means, the tab defining a hole on an unclamped portion of the tab for attaching the weights to the fishing line.

In another embodiment, a detachable sinker according to the invention includes a sack of rapidly disintegrating water soluble material, weight loaded within the sack, and an attachment means for coupling the sack to the fishing line. A wildlife attractant may be contained within the sack.

In another embodiment, the invention provides a sinker assembly that includes a detachable sinker, a fixed sinker, and an attachment means having a first portion for attaching the assembly to a fishing line, a second portion for attaching the detachable sinker to the assembly, and a third portion for attaching the fixed sinker to the assembly. One or both of the detachable sinker and the fixed sinker may be dissolvable weights and may include a wildlife attractant.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals designate like parts throughout the different views, wherein:

FIG. 5 is a perspective view of an embodiment of a detachable sinker according to the invention having a rectangular weight wrapped by an adhesive strip of rapidly disintegrating water soluble material.

FIG. 6 is a perspective view of an embodiment of a detachable sinker according to the invention having a rapidly disintegrating water soluble bag enclosed by a staple with eyelet.

FIG. 7 is a perspective view of another embodiment of a detachable sinker according to the invention having a rapidly disintegrating water soluble ring passing through a hole formed in a rectangular weight.

FIG. 8 is a perspective view of an embodiment of a detachable sinker according to the invention having a rapidly disintegrating water soluble tab clamped between rounded, riveted weights.

FIG. 9 is a perspective view of another embodiment of a detachable sinker according to the invention having a rapidly disintegrating water soluble tab clamped to a rectangular weight.

FIG. 10 is a perspective view of an embodiment of a detachable sinker according to the invention having a rapidly disintegrating water soluble bag affixed with a wildlife attractant.

FIG. 11 is a perspective view of an embodiment of a detachable sinker according to the invention having a rapidly disintegrating water soluble tab fixed to a dissolvable wildlife attractant that acts as a weight.

FIG. 12 is a perspective view of another embodiment of a detachable sinker according to the invention having a rapidly disintegrating water soluble tab fixed to a dissolvable wildlife attractant that acts as a weight.

FIG. 16 is a side view of another removable means according to the invention for attaching a detachable sinker according to the invention to a length of fishing line.

FIG. 17 is a top view of the removable attaching means of FIG. 16.

FIG. 18 is an end view of the removable attaching means of FIG. 16.

FIG. 19 is an illustration of the removable attaching means of FIG. 16 attaching a detachable sinker according to the invention to a length of fishing line.

FIG. 23 is a conceptual drawing of another removable means according to the invention for attaching a detachable sinker according to the invention to a length of fishing line.

FIG. 24 is a side view of another embodiment of a detachable sinker according to the invention having a rapidly disintegrating water soluble loop fixed to a dissolvable weight containing a wildlife attractant.

FIG. 25 is an illustration of the removable attaching means of FIG. 23 in an open position attaching the detachable sinker of FIG. 24 to a length of fishing line.

FIG. 26 is an illustration of the removable attaching means of FIG. 23 in a closed position attaching the detachable sinker of FIG. 24 to a length of fishing line.

FIG. 31 shows rear (A), side (B), top (C), and front (D) views of one embodiment of a means according to the invention for attaching both a detachable weight and a fixed weight to a length of fishing line.

FIG. 32 shows a top view of the attachment means of FIG. 31 with the fixed weight attached.

FIG. 33 shows a top view of an embodiment of a sinker assembly according to the invention that includes an attachment means, a detachable weight, and a fixed weight, each weight either non-dissolvable or dissolvable and capable of incorporating a wildlife attractant.

DETAILED DESCRIPTION OF THE INVENTION

The following disclosure presents various exemplary embodiments of the invention for providing a detachable sinker with a rapidly disintegrating water soluble material used to effect attachment. The sinker allows a fisherman to benefit from additional weight to achieve superior distance when casting, and improves the precision of bait delivery without burdening the fisherman with the additional weight dragging on the line during retrieval. The invention also improves the presentation of bait after entering the water and during retrieval, and can leave a trail of wildlife attractant in the wake of fishing line being retrieved, or can leave a patch of wildlife attractant resting on the bottom near the fisherman's casting area.

Figure 1:
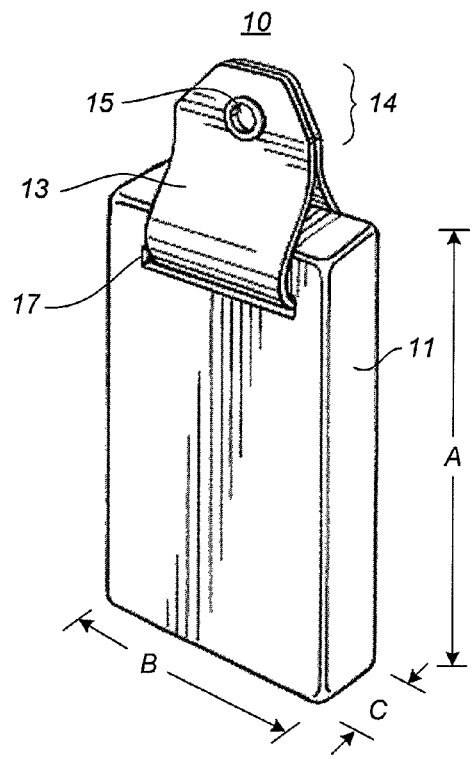
FIG. 1 is a perspective view of one embodiment of a detachable sinker according to the invention held by a rapidly disintegrating water soluble tab.

FIG. 1 illustrates one embodiment of a detachable sinker 10 according to the invention. Sinker 10 includes a volume or mass of material 11 acting as a weight, and a rapidly disintegrating water soluble material 13 for attaching the weight to a fishing line. Sinker 10 may also include a fastening component 15 that acts as a strengthening interface between the fishing line and the rapidly disintegrating water soluble material 13.

Weight 11 may be any material of sufficient density to assist a fisherman in casting out the fishing line. Weight 11 may be formed as a single mass, or may be a group of smaller masses collected together. Examples of material that may compose weight 11 include any one or any combination of the following: iron, steel, cast iron, lead, stone, concrete, ceramic, or other dense metals or refractory type materials. These materials are offered as examples only, and not by way of limitation. In a preferred embodiment, steel is used as the material of choice for a number of reasons, including cost, ease of fabrication, dissolution in water by rusting, and environmental compatibility.

Rapidly disintegrating water soluble material 13 may be composed of any material that when dry, possesses sufficient tensile strength to withstand the load of weight 11 during casting, and when wet, can rapidly release weight 11 from the fishing line shortly after contacting water. In one embodiment, sinker 10 may have a ten-second release time, which means that at ten seconds (plus or minus some tolerance) after immersion in water, material 13 dissolves such that it loses its tensile properties. Loss of tensile properties means that an amount of material 13 (such as a ½ inch wide strip) used on sinker 10 for retaining a specific weight 11 (e.g. one-ounce) is no longer able to support the specific weight against the pull of gravity under water. In another embodiment, a sinker 10 may have a one-second release time, meaning that an amount of material 13 used on sinker 10 loses its ability to support a specific weight against the pull of gravity under water in about one second. Release times other than one and ten seconds are possible within the scope of the invention. Examples of tolerances are tolerances on the order of 5 seconds, or 1 second, or a fraction of a second.

The release time of a sinker according to the invention is a predetermined value that may be determined, for example, based on empirical data and experimentation. The predetermined release time may indicate an approximate time lapse after the sinker is immersed in water after which the rapidly disintegrating water soluble material dissolves sufficiently to release the weight from the fishing line or to allow the weight to detach therefrom. The release time of the sinker may also be expressed in terms of a range, i.e. a time period. For example, the time period may have a duration anywhere between about one second and about 120 seconds.

According to the invention, release time may also be expressed in terms of water depth. That is, a sinker may have a depth rating that indicates an approximate depth at which the rapidly disintegrating water soluble material dissolves in water sufficiently to release the weight from the fishing line after the sinker sinks from a surface of the water by force of gravity. In one embodiment, the detachable sinker may have a depth rating of about one foot. In another embodiment, the detachable sinker may have a depth rating expressed in terms of a range, where the range may lie anywhere between about one foot and about 1000 feet. Also, the detachable sinker may have more than one release time or depth rating. For example, the sinker may have a first rating for use in fresh water, and a second rating for use in salt water.

A sinker according to the invention, or any embodiment of such a sinker herein disclosed, may include readable indicia printed, stamped, molded or otherwise formed on the sinker that corresponds to a weight value, a release time value, a release time range, a depth rating, or a depth range. The indicia may also include multiple indices corresponding to both salt water and fresh water ratings for depth or release time.

In one embodiment, material 13 may be composed of a paper-like material such as Dissolvo®. Other paper and paper-like products are also suitable for this purpose, such as materials used to temporarily block or dam pipes, and materials used in the formation of packaging labels that very easily dissolve in water. Material 13 may be formed as a bag, a strap, or another configuration suitable for attaching to or containing weight 11. Material 13 may be folded any number of times to achieve a desired tensile strength, or a desired release time. By making slight adjustments in the number of folds, or in the formulation or configuration of material 13, a sinker according to the invention can be adjusted to descend to a specific depth, or to a depth range, before releasing the attached fishing device or bait to assume its natural buoyancy and underwater mobility. Different depth ratings may be advantageous for certain types of fishing or in presenting certain types of bait.

Fastening component 15 may be provided to facilitate attachment of weight 11 to material 13. In one embodiment, fastening component 15 may be a ring or grommet, made of metal, paper, plastic, or rubber material. Preferably, fastening component 15 is composed of a biodegradable material. Fastening component 10 may also be formed from the same material as material 13, with a greater thickness or density to improve the strength of attachment.

As shown in FIG. 1, weight 11 may define a hole or slot 17 formed through its mass. Rapidly disintegrating water soluble material 13 may be formed into a foldable or bendable strip, and passed through hole 17. Doubling the strip of material 13 in this fashion provides for greater tensile strength. The ends 14 of material 13 may then be joined together using component 15 and coupled to weight 11 as shown. The ends 14 may be attached together by gluing, stapling or other fastening or adhesive means. Alternatively, fastening component 15 may also function as the fastening means to connect ends 14. Weight 11 may then be attached to a fishing line by threading the line through fastening component 15 and tying it off, for example, using a fisherman's knot.

In operation, within a few seconds or less after immersing sinker 10 in water, material 13 disintegrates, thereby releasing weight 11 from the fishing line. Individual components of sinker 10 would then deteriorate in the water in an environmentally friendly manner. A weight 11 made from iron would eventually rust away and release environmentally harmless iron oxide into the water. Rapidly disintegrating water soluble material 13 would quickly dissolve and release into the water its environmentally harmless constituents such as cellulose, silica, and paper fiber. Fastening component 15 would either dissolve, or be drawn out of the water with the fishing line, depending on the hydrophilic properties of its material.

In one exemplary embodiment, length A may be about 1 inch, width B may be about ¾ inches, and thickness C may be between about ¼ and about ⅜ inches. When sinker 10 is formed from steel, these dimensions produce a weight 11 weighing about one ounce. The dimensions may be scaled, as necessary, to achieve a desired weight.

Many other embodiments of a sinker according to the invention are possible. In each of the following embodiments, the materials of construction of the various components may be similar to materials disclosed in the embodiment of FIG. 1.

Figure 2:
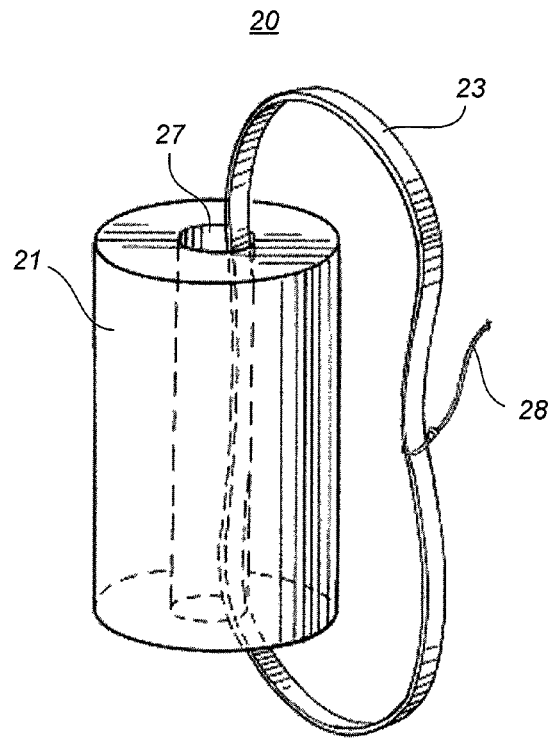
FIG. 2 is a perspective view of one embodiment of a detachable sinker according to the invention having a cylindrical weight held by a rapidly disintegrating water soluble ring.

FIG. 2 shows another embodiment of a sinker according to the invention. Sinker 20 includes a cylindrical weight 21, which has a hole 27 drilled through its center along a longitudinal axis, as shown. Rapidly disintegrating water soluble material 23 may be formed into one or more loops that pass through hole 27. A fishing line 28 may be attached directly to material 23. This embodiment does not use a separate fastening component. Weight 21 may be conveniently cut from metal pipe stock at any of various lengths to achieve a desired weight. Weight 21 may also be cut from bar stock and drilled to form hole 27.

Figure 3:
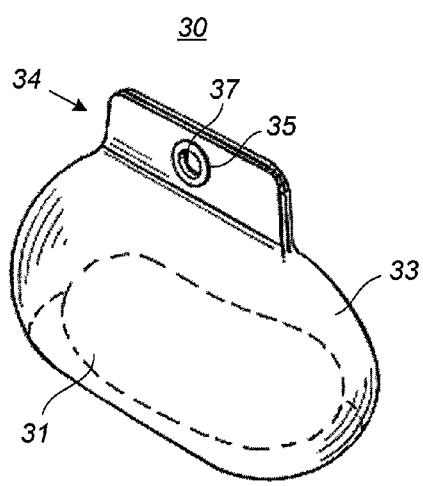
FIG. 3 is a perspective view of another embodiment of a detachable sinker according to the invention having a rapidly disintegrating water soluble bag for holding weight.

FIG. 3 illustrates another embodiment of a sinker according to the invention. In this embodiment, sinker 30 may generally resemble a tea bag. A weight or group of weights 31 may be contained within a bag 33 that is formed from a rapidly disintegrating water soluble material. Bag 33 may be enclosed at one end 34 by stapling, grommeting, adhesive, or other means. A hole 37 may be formed in the closed end 34 for threading of fishing line. A grommet 35 may be used to strengthen hole 37 or securely close the end 34. In sinker 30, different weights for weight 31 may be achieved by loading different amounts of small weights (such as metal shot) into bag 33 prior to closing the bag.

Figure 4:
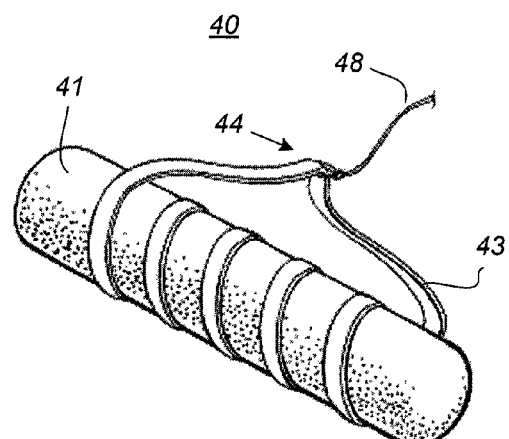
FIG. 4 is a perspective view of another embodiment of a detachable sinker according to the invention having a bar weight wrapped by a rapidly disintegrating water soluble strip.

FIG. 4 illustrates another embodiment of a sinker according to the invention. In this embodiment, sinker 40 may be formed from a bar weight 41 that may be generally cylindrical or rectangular and wrapped one or more times with a continuous strip 43 of rapidly disintegrating water soluble material. The ends of strip 43 may be joined together at a location 44, thereby forming a loop through which a fishing line 48 may be threaded and attached, as shown. Weight 41 may be conveniently cut from metal rod or bar stock at any of various lengths to achieve a desired weight.

FIG. 5 shows another embodiment of a sinker according to the invention. Here, sinker 50 includes a generally rectangular weight 51 and a strip 53 of rapidly disintegrating water soluble material. Strip 53 may be glued or pinned to weight 51 along opposing sides 56 and 58 of weight 51. In one embodiment, strip 53 may be an adhesive strip. Tabs 59 may be formed at the ends of strip 53 and attached together above the top of weight 51 by stapling or gluing or grommeting. A perforation or hole 57 may be formed in tabs 59, through which fishing line may be threaded and tied off. A grommet 55 may be used to reinforce the hole 57, and to join together two ends of strip 53.

FIG. 6 shows another embodiment of a sinker according to the invention that may resemble a small bag. Sinker 60 may include a weight or group of small weights 61 that are enclosed within a sack 63 formed from rapidly disintegrating water soluble material. The top 64 of sack 63 may be pinched together to enclose its contents. A staple 65 having an eyelet 69 may be affixed to the top 64. The staple 65 pinches the top 64 of sack 63 to keep the sack closed and to prevent weight 61 from falling out. Eyelet 69 provides a convenient location for attaching a fishing line to the sinker.

FIG. 7 shows another embodiment of a sinker according to the invention designed for ease of manufacture. Sinker 70 may consist of only two pieces: a weight 71 and a loop 73 of rapidly disintegrating water soluble material. Weight 71 may be formed from rectangular bar stock to any desired length, and may include a hole 75 formed through weight 71, for example, by stamping, punching, or drilling. To form loop 73, the rapidly disintegrating water soluble material may be formed first as a strip, one end of which may then be passed through hole 75, and then joined to an opposite end by stapling, compression, glue, or other adhesive to complete the loop. A fishing line may then be tied to loop 73.

FIG. 8 shows an embodiment of a sinker according to the invention designed for ease of manufacture using weight materials that may be obtained off the shelf from a hardware store. Sinker 80 includes a plurality of circular weights 81 and rapidly disintegrating water soluble tab 83 that is clamped between the weights. Weights 82 may be flat washers made of carbon steel, plated steel, or another metal, metal alloy, or dense material. These weights or washers may be stacked to achieve a desired total weight for the sinker. Flat washers are a preferred material in this embodiment for many reasons. Flat washers are available in a wide selection of weights and sizes, and may be easily combined and joined together. In addition, the center hole of each flat washer provides a means for attaching at least one washer on either side of tab 83, and clamping tab 83 between the washers, as shown. Clamping the tab in this manner may be achieved using fasteners such as a bolt and nut, or by using a pin or rivet 88. In this configuration, tab 83 must allow the bolt, pin, or rivet 88 to pass through the center holes of the flat washers to properly clamp the tab securely in place. This may be achieved by inserting tab 83 only part way between the washers so that no part of the tab interferes with the center holes, or tab 83 may be shaped to allow passage of rivet 88, for example, by forming an open area or hole (not shown) in tab 83 that may be aligned with the center holes of washers 81. Tab 83 may also include an eyelet or hole 87 on an unclamped portion of the tab for attaching sinker 80 to a fishing line.

FIG. 9 shows an embodiment of a sinker according to the invention capable of providing heavier weights than some of the sinkers previously described. Sinker 90 may be formed from a rectangular weight 91, one or more clamping brackets 98, and a rapidly disintegrating water soluble tab 93 clamped between weight 91 and brackets 98. Holes 96 may be formed in brackets 98 and aligned with cooperating holes or studs formed in weight 91 to provide a means for clamping weight 91 and tab 93 between clamping brackets 98, using fastening hardware or equivalent. Preferably, tab 93 is folded in half so that it may be clamped to weight 91 at both the front and rear sides of the weight, as shown. This provides about twice as much clamping area across the tab as may be provided, for example, in the embodiment of sinker 80. And, as in the embodiments of sinkers 10 and 50, doubling the tab of rapidly disintegrating water soluble material provides greater tensile strength. The additional clamping area combined with the double tab allows the tab to suspend a greater amount of weight for the sinker. A hole 97 may be formed through both halves of the doubled tab 93, as shown, for attaching a fishing line or leader.

In any of the foregoing embodiments, a sinker according to the invention may be scaled up or down, depending on the application. For example, the embodiments of sinkers 10, 20, 40, 50, 70, and 90 may be most suitable for scaling up for lake or deep-sea fishing, while the embodiments of sinkers 30, 60, and 80 may be most easily miniaturized for pond, stream, or fly fishing. In the latter case, the sinker may be attached to a lure or fly by impaling the bag or sack portion of the sinker directly onto the fish hook.

FIG. 10 shows an embodiment of a sinker according to the invention that includes an additional component for attracting fish or other wildlife. A bag-type sinker 100 may be generally similar to sinker 30, and may include a weight 101 enclosed within a bag 103 made from a rapidly disintegrating water soluble material. An optional fastening component 105 (such as a grommet) may be attached a closed end of the bag 103 as in embodiments previously described. A scent or attractant 106 may be collected in a dense, concentrated form and suspended on, attached to, or held within the rapidly disintegrating water soluble bag 103. Scent 106 may be any natural or artificial wildlife attractant or scent, such as fish attractant manufactured by Scientific Bass Products, Inc.

Upon immersion of bag 103 into water, the bag rapidly dissolves, releasing both the weight 101 and the scent 106. In another embodiment, the scent may be commingled with the weight, for example, by mixing metal particles or metal shot into the scent material. The mixture may then be attached to, suspended on, or contained within a rapidly disintegrating water soluble material. In any embodiment using the attractant, the sinker may be configured to release the mixture at a certain release time or depth.

FIGS. 11 and 12 illustrate exemplary embodiments of sinkers according to the invention that incorporate dissolvable weights. The dissolvable weights may be composed at least partially from fish attractant. The embodiments 110 and 120 vary in terms of size and shape, but for the most part function identically. Variations in size and shape will, to some degree, affect on the dynamics of the sinker during both casting and sinking. But because the sinker weights are molded, many different aesthetic or ornamental designs are possible. For example, a sinker weight according to the invention may be molded into the shape a bomb, a grenade, a fruit, a fish, a lobster, a bird, or any other animal, object, or symbol.

Each of these sinkers may include two main parts: a dissolvable weight 111 or 121, and a rapidly disintegrating water soluble tab 113 or 123. The dissolvable weight 111 or 121 may be formed from a mixture of wet and dry ingredients and molded into a desired size and shape. Prior to drying or curing, the tab 113 or 123 may be partially inserted within, or sunk into the mixture. Alternatively, the tab may be placed into a mold and the mixture may then be poured or collected around the tab. Once the dissolvable weight is sufficiently cured, the tab becomes cemented in place to provide a means for attaching the weight to a fishing line. A hole 117 or 127 may be formed near one end of the tab for this purpose. The opposite end of the tab (not shown) may be bent an angle or divided into multiple segments to improve its strength of connection within the cured weight.

A mixture suitable for use in creating a dissolvable weight according to the invention may be a melange of base ingredients such as water, acids, bases, salts, oils, emulsifiers, plasticizers, thickeners, and additives such as scents, colorings, and organic bait or fish foods. When freshly mixed, the melange should have a thick, moldable consistency, like a damp mixture of grout or plaster. When dry and cured, the mixture forms a densely packed, cohesive but somewhat crumbly solid. When the cured mixture is immersed in water, it dissolves partly or completely and effervesces, releasing the additives to diffuse throughout the water.

One example of a dissolvable weight mixture according to the invention may be formed from the following dry and wet ingredients and in the stated general proportions:

Dry Ingredients: 1 cup baking soda, ½ cup citric acid, ½ cup corn starch, ⅓ cup sea salt, 1 tablespoon shrimp meal.

Wet Ingredients: 1½ tablespoons vegetable oil, 1 tablespoon fish oil, ¾ tablespoons water, ¼ teaspoon borax, 1 to 2 drops of red food color.

To properly form the melange, the first three dry ingredients may be sieved to achieve a smooth, homogeneous blend. The salt and shrimp meal may then be added to the other dry ingredients and thoroughly mixed in. The wet ingredients may be combined in a separate container and mixed or shaken vigorously for about half a minute. The wet ingredients may then be gradually added to the dry ingredients while continuously mixing the two together to inhibit chemical reactions. When the wet and dry ingredients form a homogeneous mass, the mixture is ready to be poured or pressed into a mold to form a dissolvable weight. The rapidly disintegrating water soluble material should be placed into the mold at this time. The molded weight may then be left to cure, for example, by slowly drying in ambient conditions for a period between about two and about ten days, or by baking for a period of between about two and about six hours at temperature between about 150 and about 200 degrees F.

The above recipe is presented as an example only, and does not limit the invention in any way. Generally, the melange should contain a base and an acid in a proportion that produces a fizzing effect that forcibly distributes the additives throughout the water. For example, a dissolvable weight composed primarily of a base such as baking soda or other soluble carbonate, sesquicarbonate, or bicarbonate, and an acid such as citric acid or other organic acid, will upon immersion react with water and dissolve, producing carbon dioxide gas and releasing its interior contents. In a baking soda and citric acid mixture, the ratio of soda to acid should be kept at around 2:1. However, many other mixtures for dissolvable weights according to the invention are possible, using more, fewer, or additional ingredients. Colorings other than red may be used, or colorings may be omitted and one of various other visual attractants added, such as shiny fish scales. Epsom salts may be substituted for sea salt or salt may be omitted entirely. Wildlife attractants such as dried blood, fish scents, fish pheromones, fish meal, insects, dry bait, powdered grains, and other organic materials may be added to the melange, so that when it dissolves, fish or other wildlife may be attracted to the general area where the fisherman casts his line. Even without wildlife attractant added to the dissolvable weight, the invention provides an environmentally friendly advantage, in that the dissolvable weight may be composed entirely of biodegradable ingredients that quickly become diluted throughout, or disappear from the water.

The present invention also provides novel means for attaching a detachable sinker with water soluble attachment to a fishing line. Several examples of attachment means are disclosed in the following paragraphs. Generally, these attachment means include a fastening component that provides a strengthening interface between the rapidly disintegrating water soluble material and the fishing line.

Figure 13:
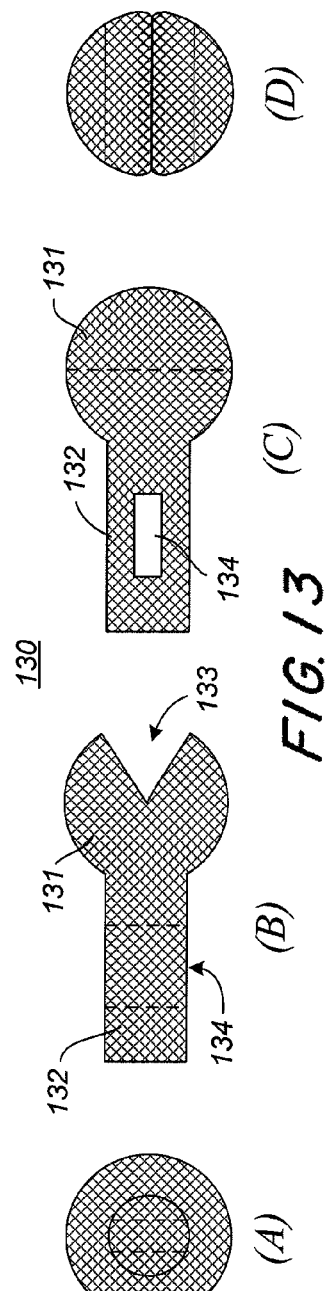
FIG. 13 shows rear (A), side (B), top (C), and front (D) views of a means according to the invention for attaching a detachable sinker according to the invention to a length of fishing line.

FIG. 13 shows rear (A), side (B), top (C), and front (D) views of a means according to the invention for attaching a detachable sinker according to the invention to a length of fishing line. Attachment means 130 may be described as a modified split shot, composed of a clamp portion 131 that is coupled to a sinker attachment portion 132. These portions may be formed from a single piece of material, for example, from a metal such as lead, or from an alloy of iron or lead. The material should possess sufficient softness or malleability to allow the wedge-shaped opening 133 of clamp portion 131 to be pinched shut by pliers or by the force of human fingers to compress a fishing line for attachment thereto. Sinker attachment portion 132 may be perforated by a hole 134 formed in the sinker attachment portion to facilitate attachment of a detachable sinker according to the invention. In one embodiment, hole 134 may have a rectangular shape sized to accept a strip of rapidly disintegrating water soluble material. The strip may be threaded through hole 134 during the process of manufacturing the detachable sinker, so that attachment means 130 becomes an integral part of a detachable sinker assembly.

In one embodiment, an attachment means 130 may have an overall length of about ½ in. to about 1.0 in. The diameter of the clamp portion 131 may be between about 3/16 in. and about 5/16 in. The sinker attachment portion 132 may have a length of between about 5/16 in. and about 11/16 in., with a diameter of about ⅛ in. to about ¼ in. The opening of hole 134 may have a length of about 50% to about 75% of the length sinker attachment portion 132, and may have a width of about 50% to about 75% of the diameter of sinker attachment portion 132. The wedge-shaped opening 133 may be formed by partially splitting the clamp portion about halfway through. In another embodiment, sinker attachment portion 132 may have a length about twice the diameter of clamp portion 131. All of the foregoing dimensions are approximations only, and may be scaled up or down depending on intended use.

Figure 14:
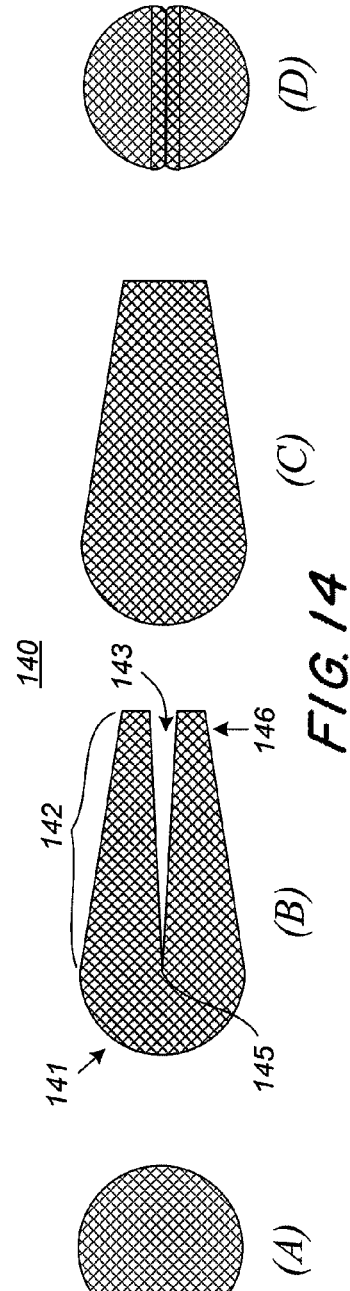
FIG. 14 shows rear (A), side (B), top (C), and front (D) views of another means according to the invention for attaching a detachable sinker according to the invention to a length of fishing line.

FIG. 14 shows rear (A), side (B), top (C), and front (D) views of another means according to the invention for attaching a detachable sinker according to the invention to a length of fishing line. Attachment means 140 may be described as split bar, or as an elongated split shot, and may be composed of a single piece of metal such as an iron or lead alloy. Attachment means 140 includes a rounded portion 141 and an elongated clamping portion 142. The elongated clamping portion may extend from approximately the midpoint 145 of a hemisphere defined by the rounded portion 141, to the narrow end 146 of the elongated clamping portion. The elongated clamping portion may be divided into first and second halves separated by a wedge-shaped split or opening 143. The overall dimensions of attachment means 140 are similar to those of attachment means 130. In one embodiment, the length of the elongated clamping portion 142 is at least twice the diameter of the rounded portion.

The length of elongated clamping portion 142 should be made sufficient to accommodate and tightly compress both a fishing line and length of rapidly disintegrating water soluble material that is affixed to sinker weight according to the invention. In use, a fishing line may first be inserted into opening 143 and positioned at or near the midpoint 145. Then, a tab or other segment of rapidly disintegrating water soluble material may be inserted into the opening 143. The two halves of the elongated clamping portion 142 may then be compressed together, thereby connecting the sinker to the fishing line. The order in which the line and tab are placed within the opening may be reversed. The line and tab may also be compressed one on top of the other.

Figure 15:
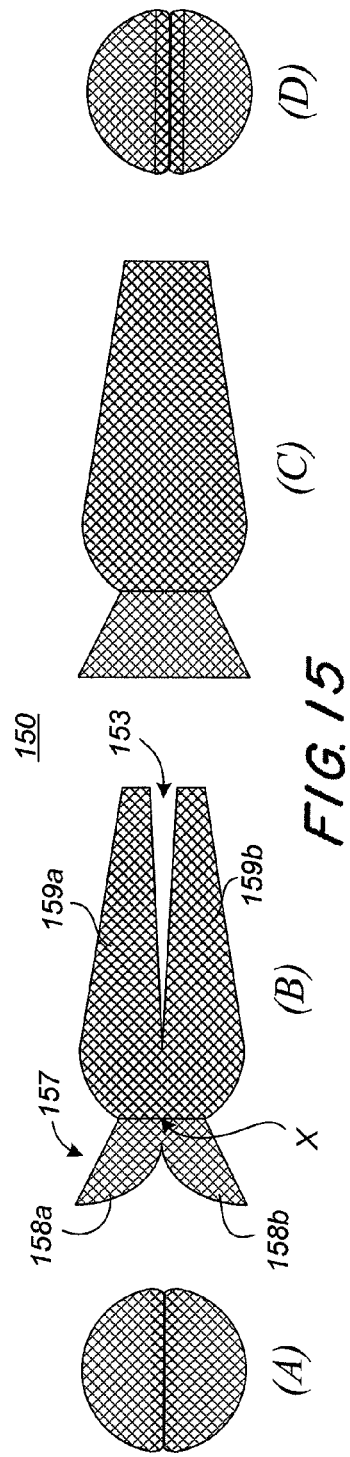
FIG. 15 shows rear (A), side (B), top (C), and front (D) views of a removable means according to the invention for attaching a detachable sinker according to the invention to a length of fishing line.

FIG. 15 shows rear (A), side (B), top (C), and front (D) views of a removable attachment means according to the invention for attaching a detachable sinker according to the invention to a length of fishing line. Removable attachment means 150 includes a rounded portion 151, an elongated clamping portion 152, and an opening mechanism 157. Removable attachment means 150 may be machined, formed, or molded from materials similar to those of attachment means 130 or 140. The dimensions of the rounded and elongated clamping portions 151 and 152 are similar to those of 141 and 142.

The opening mechanism 157 may comprise opposing hinges 158a and 158b configured to reopen legs 159a and 159b of the elongated clamping portion 152 when the elongated clamping portion is in a closed or compressed condition. Hinge 158a may be coupled to leg 159a such that rotation of hinge 158a about a fulcrum X causes leg 159a to rotate about the fulcrum in the same direction as hinge 158a, and vice versa. Similarly, hinge 158b may be coupled to leg 159b such that rotation of hinge 158b about the fulcrum X causes leg 159b to rotate about the fulcrum in the same direction as hinge 158b, and vice versa. Thus, when hinges 158a and 158b are pinched or compressed together, legs 159a and 159b rotate in opposite directions to reopen the elongated clamping portion 152, and to allow for removal of the removable attachment means from fishing line. Compression of legs 159a and 159b, for example, against a fishing line and rapidly disintegrating water soluble tab, causes hinges 158a and 158b to rotate in opposite directions to reset the hinges. The size and construction of the opening mechanism 157 may be designed to allow reopening of the removable attachment means by compressing the hinges with pliers, human fingers, or between a fisherman's teeth.

FIG. 16 shows a side view of another embodiment of a removable means according to the invention for attaching a detachable sinker according to the invention to a length of fishing line. Removable attachment means 160 includes a metal weight 161 (e.g. lead or iron-based) having a hollow core and a longitudinal slit 162 cut along the entire length of the weight and penetrating to the hollow core. The hollow interior of the weight is filled with a pliable material 163, which may be a foam rubber or other synthetic elastomer. This basic design is commonly referred to as a rubber-core sinker. This type of sinker may be removably attached to a fishing line by inserting a length of the fishing line into the slit and forcing it to a position inside the weight and away from the slit where it can be held tightly in place by pressure of the pliable material 161 against the inner wall of the weight. The fishing line can be later removed by pulling action.

FIGS. 17 and 18 illustrate how the configuration of removable attachment means 160 departs from conventional rubber-core design. FIG. 17 shows a top view of removable attachment means 160. FIG. 18 shows an end view of the removable attachment means 160. A perforated sinker attachment portion 164, which may be formed as a ring or loop 164, extends from the side of removable attachment means 160 that is opposite the slit 162. A perforation or hole 165 defined by the ring 164 provides a coupling location for a tab or loop of rapidly disintegrating water soluble material. In one embodiment, the tab or loop may be threaded through hole 165 during the process of manufacturing a detachable sinker, to make removable attachment means 160 an integral part of a detachable sinker assembly according to the invention.

FIG. 19 illustrates a removable attaching means 160 attaching a detachable sinker according to the invention to a length of fishing line. A loop of rapidly disintegrating water soluble material 193 passes through ring 194, coupling the dissolvable weight 191 of the detachable sinker to the removable attaching means 160. Fishing line 198 may then be removably attached to means 160 as previously described. The removable attachment means 160, rapidly disintegrating water soluble material 193, and dissolvable weight 191 make up a detachable sinker assembly 190 according to the invention. These components may be assembled by threading material 193 through ring 194, then partially sinking material 193 into the melange of dissolvable weight 191 prior to curing. In this particular example, dissolvable weight 191 has an indicia 195 molded or printed on an outer surface to indicate a release time. The indicia "20 S" may correspond to an approximate release time of twenty seconds.

Figure 20:
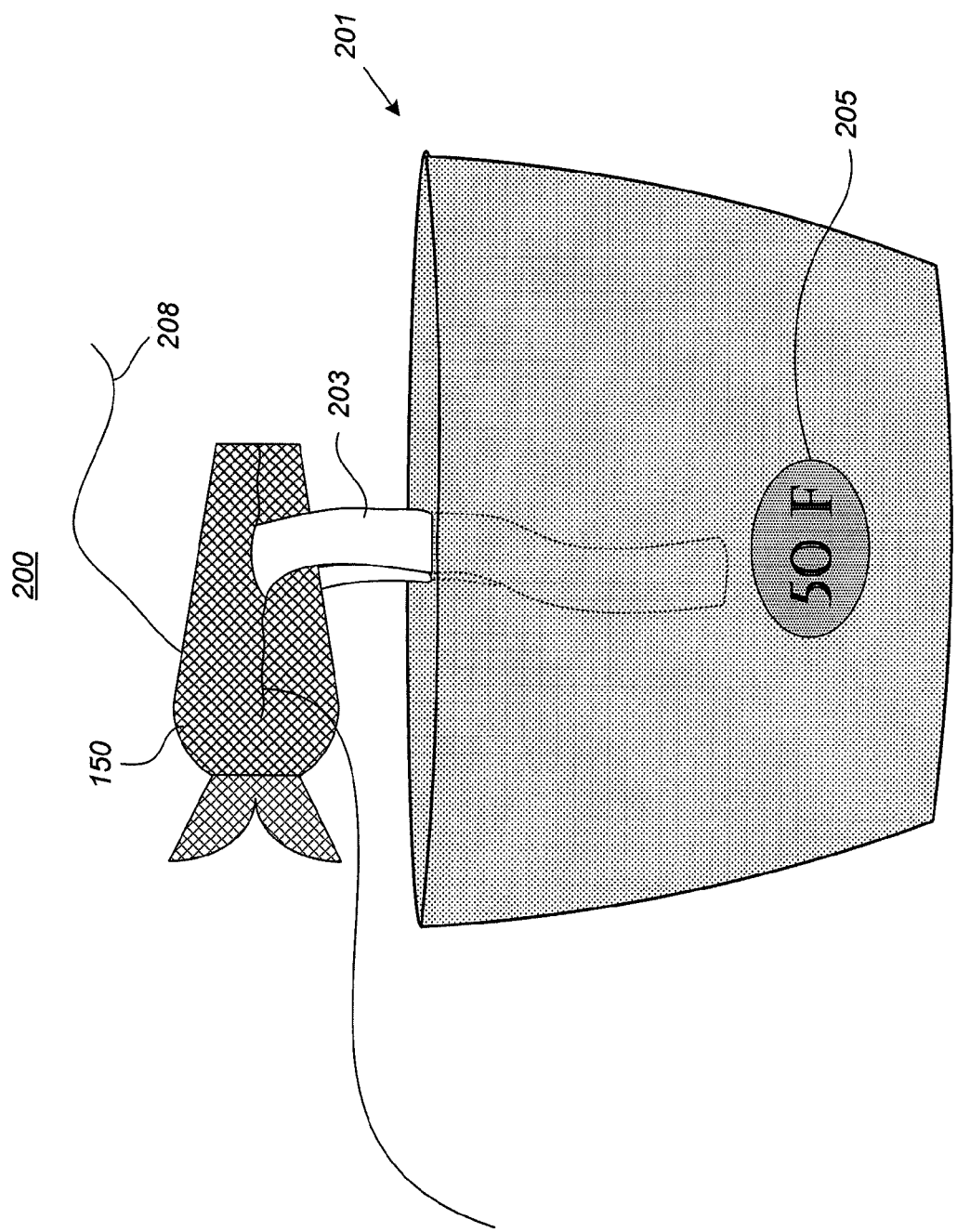
FIG. 20 is an illustration of the removable attaching means of FIG. 15 attaching a detachable sinker according to the invention to a length of fishing line.

FIG. 20 illustrates an assemblage 200, wherein a removable attaching means attaches a detachable sinker according to the invention to a length of fishing line. In this scenario, the elongated removable attaching means 150 is used to clamp both the fishing line 208 and a tab or loop 203 of rapidly disintegrating water soluble material. Loop 203 is a fixed component of the detachable sinker 201, which is made as a dissolvable weight, with or without a fish attractant, according to any of the methods previously described. One advantage of this arrangement is that the removable attachment means and dissolvable sinker components may be manufactured and packaged separately. In this particular example, detachable sinker 201 has an indicia 205 marked on an outer surface of the weight to indicate a depth rating. The indicia "50 F" may correspond to an approximate depth of fifty feet to which the sinker will sink in fresh water under force of gravity before being released by disintegration of loop 23.

Another advantage is that the removable attachment means 150 is reusable, that is, it may be attached and removed many times. When a fisherman prepares an assemblage 200 and casts the line into the water, the rapidly disintegrating water soluble tab will release the dissolvable weight. When the fisherman reels the line back in, only the removable attachment means will remain attached to the line. The removable attachment means may then be removed from the line by pinching its hinges, and then used again to attach a new sinker.

Another advantage of using any of the attachment means according to the invention (such as 130, 140, and 150) is that they allow the fisherman to deploy two different weights for a single cast—the first weight being the combined weight of the detachable sinker and the attachment means, and the second weight being only the weight of the attachment means. Moreover, the fisherman may achieve this advantage using a singular assembly such as 190 or 200. Using these assemblies, a fisherman can enjoy the benefits of a greater casting distance provided by the detachable sinker, and after the sinker detaches, advantageously maintain a lesser weight on the end of the line to achieve a desired depth for the bait, or to achieve a desired resistance when reeling in, or both.

Figure 21:
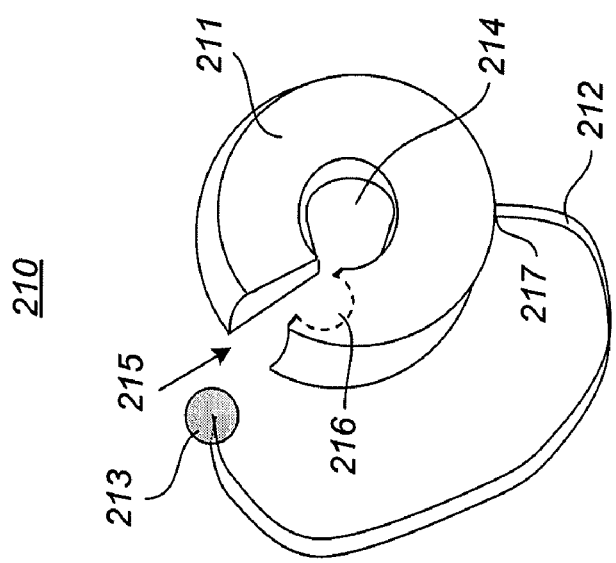
FIG. 21 is a perspective view of another removable means according to the invention for attaching a detachable sinker according to the invention to a length of fishing line.

FIG. 21 shows another removable means according to the invention for attaching a detachable sinker according to the invention to a length of fishing line. Fastener assembly 210 includes a fastening ring 211, a fastening loop 212, and a fastening ball 213. Fastening ring 211 may be composed of a pliable or slightly pliable material such as plastic or metal. Fastening ring 211 may be generally circular and sized to any diameter, but will typically have a diameter of about ⅜ in. to about ⅝ in., and a thickness of about ¼ in. to about ⅜ in. Fastening loop 212 may be composed of a plastic strip or fishing line, and may have a length of about 1.0 in. to about 2.0 in. Fastening ball 213 may be composed of a solid or semi-solid plastic ball and may have a diameter of about 3/16 in. All of these dimensions are approximations only, and may scaled up or down for a particular application.

A center hole 214 is formed through fastening ring 211 to allow passage of fishing line therethrough. A fastening channel 215 is formed in the ring, and extends from the outer rim of the ring to the center hole 214. Fastening channel 215 allows for passage of fishing line to the center hole 214 so that the fastener assembly may be attached thereto without having to thread the fishing line through the center hole. To maintain the fishing line within the center hole, a recess 216 is formed along one side of fastening channel 215, as shown, so that the fastening ball 213 may be inserted by force of friction through fastening channel 215 until it locks within recess 216. The width of fastening channel 215 may be sized slightly smaller than the diameter of the fastening ball 213, so that the pliable walls of fastening channel 215 must be forced slightly apart to pass the fastening ball to the recess. The spherical portion of recess 216 may be sized at approximately the same diameter as fastening ball 213 to snugly accommodate it. When fastening ball 213 is in the locked position within the recess, it blocks the fastening channel 215 to prevent the fishing line from exiting the fastener assembly through the fastening channel. The fastening ball 213 may be connected to the fastening ring by the fastening loop 212. The fastening loop may terminate at a location 217 on the outer diameter of the fastening ring, as shown.

Figure 22:
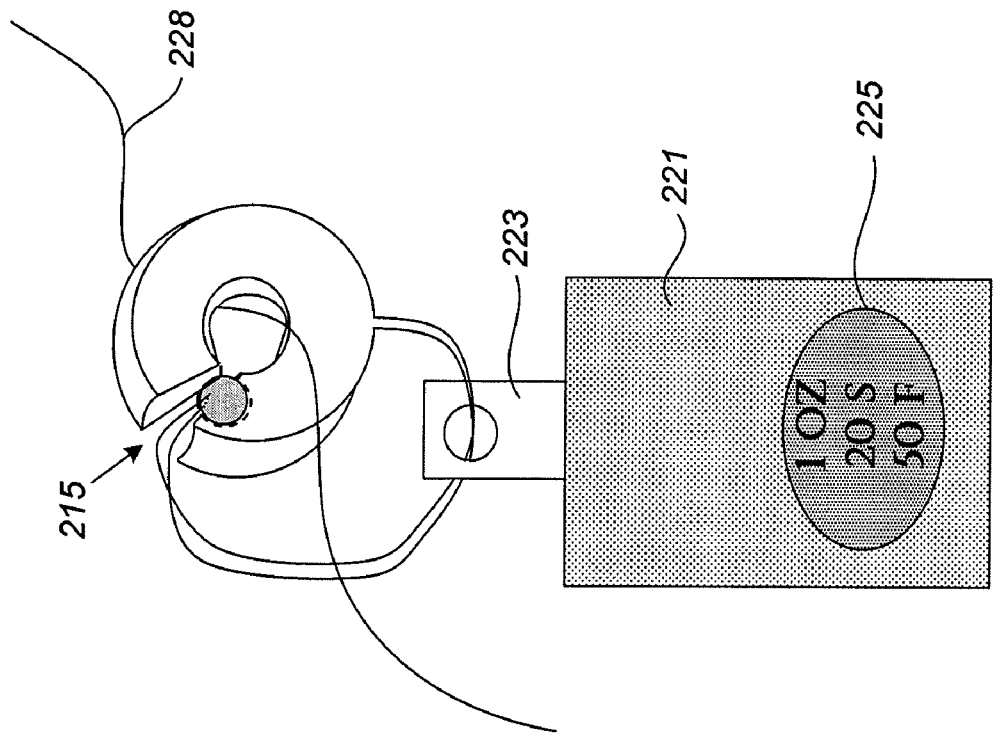
FIG. 22 is an illustration of the removable attaching means of FIG. 21 attaching a detachable sinker according to the invention to a length of fishing line.

FIG. 22 illustrates the removable attaching means 210 attaching a detachable sinker according to the invention to a length of fishing line. To properly make this connection, a fisherman may first pass the fishing line 228 through fastening channel 215. The fastening loop 212 may then be passed through a rapidly disintegrating water soluble tab 223 that is fixed to the weight 221 of a detachable sinker, and the fastening ball 213 may then be locked into the recess. In this particular example, weight 221 has indices 225 stamped or printed on an outer surface to indicate a weight value, a release time, and depth rating. The indicia "1 OZ" may correspond to a weight value of one ounce, the indicia "20 S" may correspond to a release time of twenty seconds, and the indicia "50 F" may correspond to a depth rating of fifty feet. These indicia may apply to fresh water or salt water or both. In another embodiment, two sets of indicia may be provided, one indicating fresh water ratings and the other indicating salt water ratings.

FIG. 23 shows another removable means according to the invention for attaching a detachable sinker according to the invention to a length of fishing line. The embodiment shown is a removable clip 230. Removable clip 230 may be formed from a single piece of pliable plastic or metal, and may compose two legs 231 and 232 connected at a vertex 233. Between the two legs vertex 233 defines an eyelet 234 through which a fishing line may be threaded or passed. The ends 235 and 236 of legs 231 and 232 may be serrated or configured with interlocking teeth, generally as shown, so that the ends of the legs may be pressed together into a locked position by interlocking the teeth or serrations. To unlock the legs of clip 230, the two legs may be slid apart transversely in opposite directions until the teeth disengage. The overall length of removable clip 230 may be in the range of about 1.0 to about 2.0 in.

FIGS. 24-26 illustrate how the removable attachment means 230 may be used to connect a detachable sinker to fishing line. Detachable sinker 240 includes a weight portion 241 and a rapidly disintegrating water soluble loop of material 243. Weight portion 241 may be a dissolvable sinker according to the invention that contains a wildlife attractant. FIG. 25 illustrates a fishing line 258 threaded through the eyelet of a removable clip 230. Loop 243 is shown positioned within clip 230 with the two legs of the clip 230 disengaged and resting in an open position. FIG. 26 shows clip 230 in a closed position, with the two legs fully engaged and enclosed around tab 243, so that the detachable sinker 240 is suspended from the fishing line.

Figure 27:
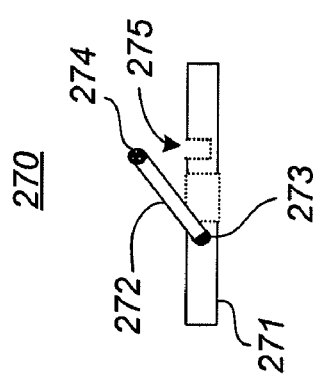
FIG. 27 is a top view of another removable means according to the invention, shown in an open position, for attaching a detachable sinker according to the invention to a length of fishing line.
Figure 28:
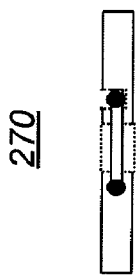
FIG. 28 is a top view of the removable attaching means of FIG. 27, shown in a closed position, for attaching a detachable sinker according to the invention to a length of fishing line.
Figure 29:
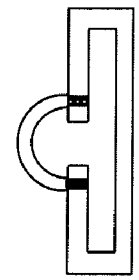
FIG. 29 is a side view of the removable attaching means of FIG. 27.

FIGS. 27-29 show another removable means according to the invention for attaching a detachable sinker according to the invention to a length of fishing line. The removable means is a metal or plastic locking clip 270, shown in an open position in FIG. 27. Locking clip 270 includes a rectangular ring 271 and a rotatable bar 272 that may be rotated with respect to the rectangular ring about a pivot point 273. Rotatable bar 272 may terminate in a pin at the pivot point, the pin being held securely within a bearing hole in the rectangular ring. A locking ball 274 may be formed at the opposite end of the rotating bar, and sized for snug insertion within a locking hole 275 formed in the rectangular ring. The overall length of clip 270 may be about 1.0 in. to about 1.5 in., with other dimensions of the locking clip being generally proportional to the overall length as shown. FIG. 28 shows a top view of clip 270 in a closed position. FIG. 29 shows a side view of clip 270 in a closed position.

Figure 30:
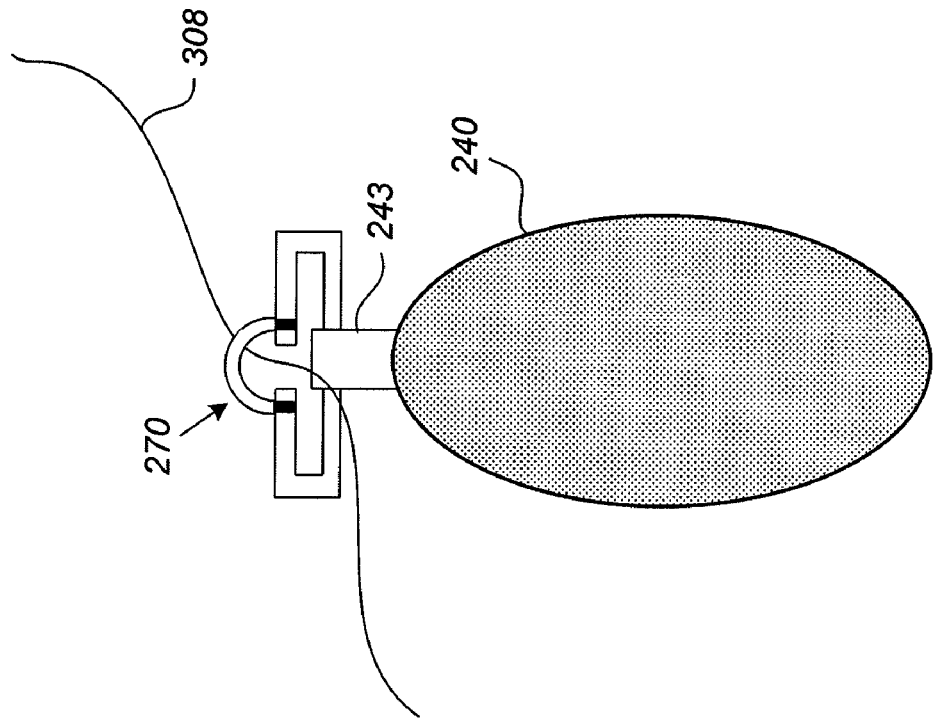
FIG. 30 is an illustration of the removable attaching means of FIG. 27 in a closed position attaching the detachable sinker of FIG. 24 to a length of fishing line.

FIG. 30 illustrates the clip 270 in a closed position attaching the detachable sinker 240 to a length of fishing line. The detachable sinker 240 may be connected to the clip by coupling tab 243 to the clip in an open position, then locking the connection by closing the clip. The fishing line 308 may be threaded through clip 270 when closed, or passed through clip 270 when open.

FIG. 31 illustrates rear (A), side (B), top (C), and front (D) views of one embodiment of a means 310 according to the invention for attaching both a detachable weight and a fixed weight to a length of fishing line. Attachment means 310 may be composed of a non-disintegrating material suitable for suspending, holding, or otherwise fixing the detachable and fixed weights. In one embodiment, attachment means 310 may be composed of a compressible metal such as lead. In another embodiment, the detachable weight may be attached to the attachment means 310 by a rapidly disintegrating water soluble material, and the fixed weight may be formed or molded around a portion of the attachment means. One or both of the detachable and fixed weights may be wholly or partially dissolvable, and may also include a wildlife attractant. Generally, the dimensions of an attachment means 310 may be on the order of those disclosed for attachment means 130, 140, and 150.

Attachment means 310 illustrates one example of a component according to the invention that provides means for attaching both the detachable sinker and the fixed sinker to a length of fishing line. In the embodiment shown, attachment means 310 includes a clamp portion 311, a base portion 312, and an intermediate portion 313 connected between the clamp portion and the base portion. A hole or slot 314 may be formed in the base portion 312 to allow the detachable sinker to be tied to the attachment means. For example, a rapidly disintegrating water soluble strip may be threaded through the hole 314 for this purpose.

The intermediate portion 313 may be a cylindrical (or rectangular) length having a diameter (or width) that is less than that of the clamp portion 311 or less than that of the base portion 312. The intermediate portion provides a convenient area for locating the fixed sinker. The attachment means 310 may also include means 319 for retaining the fixed sinker. Retention means 319 may be an outer edge or outer edges of the base and clamp portions, as shown, to prevent the fixed sinker from sliding off the intermediate portion 313. In another embodiment, retention means 319 may be a flange located on the intermediate portion, the flange having a diameter or width slightly larger than that of the intermediate portion. The flange may be well suited for retaining a weight formed or molded around the intermediate portion, for example, using a melange of materials as previously described.

Clamp portion 311 may exist in an unclamped, open position, or in a clamped, closed position. In the open position shown, clamp 311 defines a wedge-shaped opening 315. To attach the attachment means 310 to a length of fishing line, a fisherman may pass a portion of the fishing line into the wedge-shaped opening 315, then squeeze the clamp portion to its closed position by compressing the fishing line between the walls of the wedge.

FIG. 32 shows a top view of the attachment means 310 with a fixed weight 321 connected to the attachment means. Fixed weight 321 may be any mass of material, such as metal, ceramic, concrete, or moldable material. Fixed weight 321 may be formed for installation on or to the intermediate portion 313 of the attachment means 310. The materials and dimensions of fixed weight 321 may be selected to add a desired weight to attachment means 310 so that the fixed weight will not easily detach from the attachment means during casting and retrieval. The fixed weight 321 may be dissolvable or non-dissolvable.

In one embodiment, fixed weight 321 may be a dissolvable weight that incorporates a wildlife attractant. In this case, fixed weight 321 may be formed or molded, for example, using a method similar to those previously described with respect to dissolvable weights 111 and 121. That is, the fixed weight 321 may be composed from a melange of wet and dry ingredients, and may include additives such as fish food, fish scales, colorings, etc. The melange may be formed or molded around intermediate portion 313, and later dried or cured.

The exemplary attachment means 310 illustrates one embodiment of a device that may be used as part of a sinker assembly 330 according to the invention. Generally, such an assembly possesses a first portion (e.g. clamp portion 311) for attaching the assembly to a fishing line, a second portion (e.g. base portion 312) for attaching a detachable sinker to the assembly, and a third portion (e.g. intermediate portion 313) for attaching a fixed sinker to the assembly.

FIG. 33 shows a top view of an embodiment of a sinker assembly 330 according to the invention that includes an attachment means 310, a fixed weight 321, and a detachable weight 332. Either or both of the weights 321 and 332 may be non-dissolvable or dissolvable and capable of supporting, suspending, containing, holding, or otherwise including a wildlife attractant. In one embodiment, fixed weight 321 may be retainably attached to an intermediate portion of attachment means 310, detachable weight 332 may be attached to a base portion of the attachment means 310 by a strip or loop of rapidly disintegrating water soluble material 333, and the attachment means 310 may attach the entire assembly to a length of fishing line 338 by clamping or another attachment technique. Thus, after casting and within seconds after sinker assembly becomes immersed in water, detachable weight 332 is released from the assembly by disintegration of the rapidly disintegrating water soluble material 333, and sinks to the bottom. During retrieval, fixed weight 321 remains attached to the fishing line as long as it resists dissolving. Using this sinker assembly, a fisherman may advantageously deploy two different weights for a single cast, one for optimal casting distance and another for optimal retrieval.

In another embodiment, a sinker assembly 330 provides a fisherman with the ability to release wildlife attractant at one or both of the casting site and the line of retrieval. For example, a wildlife attractant may be included with a detachable weight 332 that is composed at least partially of a dissolvable material, so that the wildlife attractant may dissolve after immersion and after being rapidly released from the fishing line by the rapidly disintegrating water soluble material. The wildlife attractant will thereafter diffuse throughout the water as it sinks to the bottom, and possibly after it reaches the bottom, to attract fish to the casting site. A wildlife attractant may also be affixed to the line by inclusion on or within the fixed weight 321. Fixed weight 321 may be at least partially composed of a dissolvable material, so that during retrieval, wildlife attractant diffuses through the water along the line of retrieval from the casting site back to the fisherman.

Figure 35:
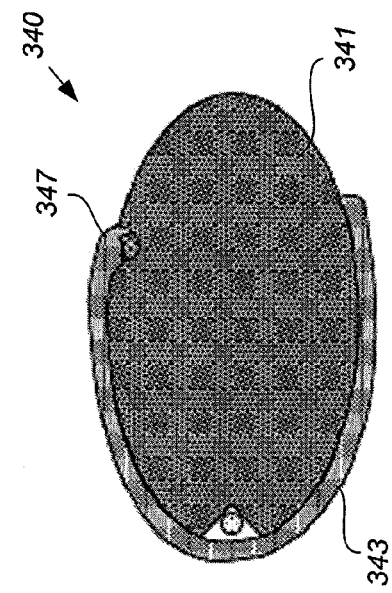
FIG. 35 shows a top view of the embodiment of FIG. 34 with the attachment means shown in a closed position.
Figure 34:
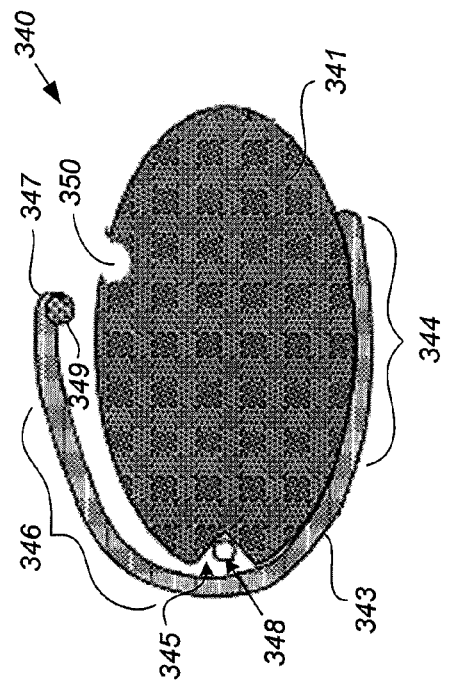
FIG. 34 shows a top view of an embodiment of a detachable sinker according to the invention having a flap of rapidly disintegrating water soluble material and a mass of moldable adhesive serving as a means (shown in an open position) for attaching the sinker to fishing line.
Figure 36:
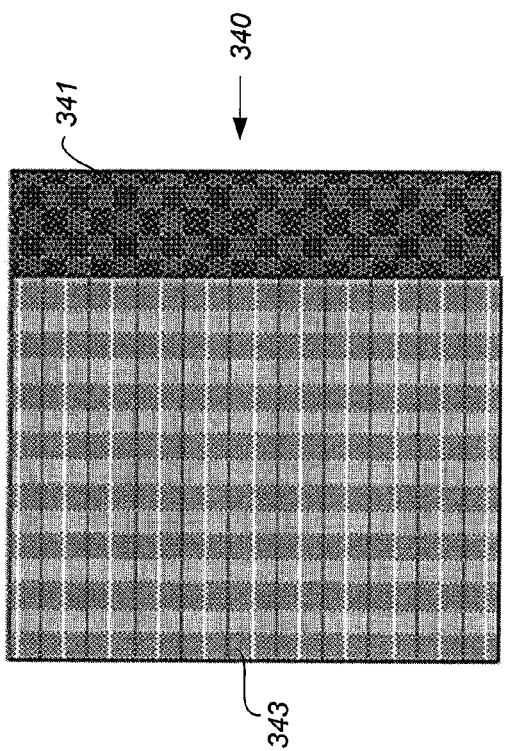
FIG. 36 shows a side view of the embodiment of FIG. 34.

FIGS. 34-36 illustrate an embodiment 340 of a detachable sinker according to the invention that is designed for easy manufacture and easy use. Sinker 340 provides a non-toxic, environmentally friendly product that will completely dissolve in water in a short period of time. Sinker 340 incorporates both a rapid release feature for detaching a sinker from fishing line, and a targeted release of fish attractant in an around the casting site. In addition, sinker 340 provides easy attachment mechanics that allow a fisherman to quickly fix the sinker by hand to the fishing line at any location above the hook, and may also provide an aerodynamic shape for improved flight through air and retrieval through water.

FIG. 34 shows a top view of sinker 340 in an open state. Sinker 340 includes a dissolvable weight or block 341, and a rapidly disintegrating water soluble material 343 attached to the dissolvable weight 341. In a preferred embodiment, weight 341 may be composed of a moldable melange of ingredients that includes one or more wildlife attractants, as disclosed above. When cured, dissolvable weight 341 forms a solid mass that preferably features one or more aerodynamically designed surfaces to minimize resistance when the weight is drawn through a fluid such as water or air. For example, in the embodiment shown, dissolvable weight 341 is formed as a column with an oval or elliptical cross section. Other shapes are possible, and may include at least one tapered or rounded surface for promoting laminar flow along the boundary. Various sizes of weight 341 are also possible, such as 1 oz, 2 oz, 3 oz, etc.

A rapidly disintegrating water soluble strip of material 343 may be fixed to weight 341 to allow sinker 340 to assume one of two states: an open state and a closed state. In the open state, a fixed portion 344 of material 343 adheres to an intermediate portion of dissolvable weight 341, and the remaining portion, flap 346, of material 343 remains free or unattached from dissolvable weight 341. The fixed portion 344 of material 343 may adhere to the intermediate portion of dissolvable weight 341, for example, by dissolvable glue or other biodegradable, non-toxic adhesive.

A fisherman may attach sinker 340 to fishing line by first manipulating sinker 340 into the open state, i.e., by moving or peeling flap 346 away from dissolvable weight 341. The fisherman may then slip a portion of fishing line 348 into a groove 345 formed in one end of dissolvable weight 341, as indicated in the drawing. With the fishing line 348 lying within groove 345, the flap 346 may be drawn tightly against the surface of dissolvable weight 341 to cover groove 345. Flap 346 may then be bonded to dissolvable weight 341 by pressure to achieve the closed state of sinker 340 shown in FIG. 35.

In one embodiment, an end 347 of flap 346 may comprise a soft glue strip, or may include a ball of glue or other moldable adhesive mass 349. Dissolvable weight 341 may have a channel or hole 350 formed into its surface to accommodate the moldable adhesive mass 349. The dimensions of dissolvable weight 341, flap 346, moldable adhesive mass 349 and channel 350 should be selected so that when flap 346 is stretched slightly along the surface of dissolvable weight 341, moldable adhesive ball 349 may be hand-pressed within channel 350 and thereby retain flap 346 firmly in place. In this manner, the rapidly disintegrating water soluble strip 343, the moldable adhesive mass 349, and/or the channel 350 provide an attachment means for fixing the detachable sinker to the fishing line.

The moldable adhesive mass 349 may be formed from a soft, rubber-like or plastic-like material such as that used to attach credit cards to paper, and may be made of the same adhesive used to attach the rapidly disintegrating water soluble strip 343 to the intermediate portion of dissolvable weight 341. Strip 343 may have a width sufficient to cover all or a portion of the height of dissolvable weight 341, as shown in the side view of sinker 340 in FIG. 36.

As in previously described embodiments, when sinker 340 is cast into a body of water, flap 346 rapidly disintegrates, releasing dissolvable weight 341 from fishing line 348. Weight 341 may then sink toward the bottom of the body of water, dissolving as it sinks, to release wildlife attractant in the vicinity of the casting site.

Many advantages may be realized for fishermen and others having similar interests by using a detachable sinker according to the invention. These advantages include: (1) the ability to cast line further from shores, piers, wharfs, jetties, boats, etc., to reach more fertile fishing areas; (2) the ability to cast lightweight bait more precisely; (3) relief from the burden of weight tied to a fishing line after the baited end of the fishing line enters the water; (4) allowing greater freedom of movement for bait (both live and non-live) during presentation to aquatic wildlife; (5) improving the dynamic action of bait, particularly spinners, that require uninhibited travel through water for optimal presentation to aquatic wildlife; (6) providing materials of construction that are environmentally friendly; (7) the ability to automatically release a variety of fish or wildlife attractants when the sinker enters the water to improve the chances of catching fish; (8) the ability to sink bait to a desired depth before releasing weight to allow the bait to assume its natural buoyancy and mobility; (9) the ability to deploy two different weights for a single cast, one for optimal casting distance and another for optimal retrieval; and (10) reducing the probability of snagging the fishing line on the bottom of the body of water. The latter advantage improves the chances of successfully retrieving fishing devices and baits that are cast out, thus saving time otherwise lost rebaiting and untangling the line. Moreover, fewer snags means that the fisherman can spend more time with his hook in the water, thereby increasing the odds of catching a fish.

Exemplary embodiments of the invention have been disclosed in an illustrative style. Accordingly, the terminology employed throughout should be read in an exemplary rather than a limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A detachable sinker comprising:
   a weight attachable to a fishing line, the weight having formed in a surface thereof (i) a groove for receiving the fishing line and (ii) a channel for fixing the sinker to the fishing line; and
   a rapidly disintegrating water soluble material connected to the weight, the material having a fixed portion and a free portion,
   the fixed portion bonded to the weight, and
   the free portion manipulable between closed and open states so that in the closed state the free portion attaches to the channel to maintain the fishing line within the groove, and in the open state the free portion detaches from the channel to release the fishing line from the groove; and
   a moldable adhesive mass attached to one end of the free portion, the sinker configured so that in the closed state with the free portion of the material drawn against a surface of the weight to cover the groove, the moldable adhesive mass may be pressed into the channel.

2. The detachable sinker of claim 1 wherein the rapidly disintegrating water soluble material comprises a dissolvable product that when dry, possesses sufficient tensile strength to withstand the load of the weight during casting, and when wet, rapidly dissolves to release the weight from the fishing line.

3. The detachable sinker of claim 1 wherein the weight comprises a dissolvable weight.

4. The detachable sinker of claim 3 wherein the dissolvable weight comprises a wildlife attractant.

5. The detachable sinker of claim 1 further comprising indicia displaying a depth rating for the rapidly disintegrating water soluble material, the depth rating corresponding to an approximate depth at which the rapidly disintegrating water soluble material dissolves in water sufficiently to release the weight from the fishing line after the sinker sinks from a surface of the water by force of gravity.

6. The detachable sinker of claim 1 further comprising indicia displaying a release time for the rapidly disintegrating water soluble material, the release time corresponding to an approximate time lapse after the sinker is immersed in water after which the rapidly disintegrating water soluble material dissolves sufficiently to release the weight from the fishing line.

* * * * *